United States Patent
Tabbone et al.

(10) Patent No.: US 11,620,429 B2
(45) Date of Patent: Apr. 4, 2023

(54) METHOD AND DEVICE FOR SUPERIMPOSING AT LEAST TWO IMAGES OF A PHOTOLITHOGRAPHIC MASK

(71) Applicant: Carl Zeiss SMT GmbH, Oberkochen (DE)

(72) Inventors: Gilles Tabbone, Jena (DE); Carsten Schmidt, Jena (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 243 days.

(21) Appl. No.: 16/912,914

(22) Filed: Jun. 26, 2020

(65) Prior Publication Data

US 2020/0409255 A1     Dec. 31, 2020

(30) Foreign Application Priority Data

Jun. 27, 2019   (DE) .......................... 102019209394.9

(51) Int. Cl.
| | | |
|---|---|---|
| *G06F 30/30* | (2020.01) | |
| *G03F 1/72* | (2012.01) | |
| *G03F 7/20* | (2006.01) | |
| *G06F 30/398* | (2020.01) | |
| *G06F 30/27* | (2020.01) | |
| *G06F 119/18* | (2020.01) | |

(52) U.S. Cl.
CPC .............. *G06F 30/398* (2020.01); *G03F 1/72* (2013.01); *G03F 7/705* (2013.01); *G06F 30/27* (2020.01); *G06F 2119/18* (2020.01)

(58) Field of Classification Search
None
See application file for complete search history.

(56) References Cited

U.S. PATENT DOCUMENTS

| | | | | |
|---|---|---|---|---|
| 7,570,796 | B2 * | 8/2009 | Zafar | G06T 7/0006 |
| | | | | 382/145 |
| 9,990,737 | B2 * | 6/2018 | Weber | G06T 7/0008 |
| 2015/0169997 | A1 | 6/2015 | Weber et al. | |
| 2015/0379707 | A1 * | 12/2015 | Tsuchiya | G06T 7/001 |
| | | | | 348/126 |
| 2017/0061604 | A1 * | 3/2017 | Pandev | G03F 7/70633 |
| 2019/0026881 | A1 * | 1/2019 | Sato | G06T 7/90 |
| 2019/0354019 | A1 | 11/2019 | Freytag et al. | |

FOREIGN PATENT DOCUMENTS

| | | | | |
|---|---|---|---|---|
| DE | 102013225936 | 6/2015 | | G03F 1/72 |
| DE | 102018207882 | 11/2019 | | G16Z 99/00 |

OTHER PUBLICATIONS

The First German Examination Report for German Application No. DE 102019209394.9 dated Feb. 7, 2020, No translation.

* cited by examiner

*Primary Examiner* — Leigh M Garbowski
(74) *Attorney, Agent, or Firm* — Fish & Richardson P.C.

(57) ABSTRACT

The present invention relates to a method for superimposing at least two images of a photolithographic mask, wherein the method comprises the following steps: (a) determining at least one first difference of at least one first image relative to design data of the photolithographic mask; (b) determining at least one second difference of at least one second image relative to design data of the photolithographic mask, or relative to the at least one first image; and (c) superimposing the at least one first image and the at least one second image taking account of the at least one first difference and the at least one second difference.

22 Claims, 18 Drawing Sheets

METHOD AND DEVICE FOR SUPERIMPOSING AT LEAST TWO IMAGES OF A PHOTOLITHOGRAPHIC MASK

CROSS-REFERENCE TO RELATED APPLICATIONS

The present application claims the priority of the German patent application DE 10 2019 209 394.9, which was filed on Jun. 27, 2019 at the German Patent and Trade Mark Office. The entire contents of the above application are incorporated by reference.

TECHNICAL FIELD

The present invention relates to a method and a device for superimposing at least two images of a photolithographic mask.

BACKGROUND

As a consequence of the constantly increasing integration density in microelectronics, photolithographic masks have to image structure elements that are becoming ever smaller into a photoresist layer of a wafer. In order to meet these requirements, the exposure wavelength is being shifted to ever shorter wavelengths. At the present time, argon fluoride (ArF) excimer lasers are principally used for exposure purposes, these lasers emitting light at a wavelength of 193 nm. Intensive work is being done in regard to light sources which emit in the extreme ultraviolet (EUV) wavelength range (10 nm to 15 nm), and corresponding EUV masks. In order to increase the resolution capability of wafer exposure processes, a number of variants of the conventional binary photolithographic masks are being developed simultaneously. Examples thereof are phase masks or phase shifting masks and masks for multiple exposure.

The applicant develops and manufactures measuring apparatuses for analyzing photolithographic masks that are sold under the trade name PROVE®, AIMS™ or WLCD, for example. Furthermore, the applicant develops and sells repair devices for photolithographic masks that are known under the trade names MeRiT®, RegC® or ForTune®, for example.

On account of the ever decreasing dimensions of the structure or pattern elements, photolithographic masks, photomasks or simply masks cannot always be produced without defects that are printable or visible on a wafer. For identifying defects, it is necessary to examine photomasks intensively. For examination purposes, use is often made of a plurality of measuring devices that use different measurement principles, with the objective of obtaining a comprehensive image of the behaviour of the photomask during exposure of a wafer. The measuring devices used for analyzing photolithographic masks are often imaging, i.e. the recorded measurement data of the different measuring devices are represented in the form of images and stored. This means that the measurement data are often stored locally at or in the vicinity of the respective measuring device.

In order to obtain a comprehensive characterization of a photolithographic mask from the recorded measurement data, i.e. from different images, the different images are often manually positioned next to one another on a screen in order to extract an overarching finding by means of comparative viewing of the images. However, this type of analysis is not free of subjective influences and the image assessment is based at least partly on the background experience of the observer.

Furthermore, the images of different measuring devices are often superimposed manually or with the aid of a software tool, in the hope of obtaining more information from the superimposed images than from the individual images. Image superimpositions carried out manually are likewise subject to the problems mentioned in the previous approach. With the use of a software tool, a precise scaling and/or a precise alignment of the two images with respect to one another generally do not occur, and so the superimposed images are accorded only limited meaningfulness.

The superimposition of two images of a photomask is thus an inaccurate process beset by errors.

Therefore, one of the problems addressed by the present invention is that of specifying a method and a device which improve the superimposition of two or more images of a photolithographic mask.

SUMMARY

In accordance with one exemplary embodiment of the present invention, this problem is solved by a method according to claim 1 and a device according to claim 17. In one embodiment, the method for superimposing at least two images of a photolithographic mask comprises the following steps: (a) determining at least one first difference of at least one first image relative to design data of the photolithographic mask; (b) determining at least one second difference of at least one second image relative to design data of the photolithographic mask, or relative to the at least one first image; and (c) superimposing the at least one first image and the at least one second image taking account of the at least one first difference and the at least one second difference.

By virtue of the fact that two or more images that are intended to be superimposed are referenced relative to a common basis, these images can be related to one another without being influenced by subjective influences. As a result of being referenced relative to the design data, the two images can additionally be scaled, rotated and/or distorted or rectified in an automated form. This enables exact and reproducible superimposition of two or more images. Furthermore, the two or more superimposed images can be stored as one image. As a result, for example, the course of a process of repairing a defect of a photolithographic mask can be tracked in detail.

In addition, one synthesized image or a plurality of synthesized images can be superimposed on one or a plurality of measured images since the synthesized images can likewise be generated with reference to the design data.

The steps of the method according to the invention can be carried out outside the device(s) that measure(s) the first and second images. As a result, this evaluation process no longer blocks the performance of the actual tasks of the imaging measuring device(s). The application of the method according to the invention can thus increase the throughput of the expensive measuring machine(s).

In the present application, the term "image" encompasses a two-dimensional arrangement of measurement data or a two-dimensional arrangement of synthesized data. A two-dimensional arrangement of synthesized data can be generated on the basis of design data of the photolithographic mask or can be derived from measurement data with reference to the design data. An image hereinafter generally refers to a graphical representation of measurement data and/or synthesized data for a part or a segment of a photolithographic mask.

The design data can be present as a rendered (pixelated) image in a binary or greyscale representation. The design data can be represented in the form of a two-dimensional pixel matrix, for example. However, the design data can also be present in the form of a multiplicity of polygons or polygon progressions that specify pattern elements of the photolithographic mask. The design data can also be present in the form of an abstracted description of a multiplicity of polygons or polygon progressions.

The at least one first image can be recorded by a first measuring device and the at least one second image can be recorded by a second measuring device, and the first measuring device and the second measuring device can use different measurement principles.

To give a specific example, the first measuring device can comprise a scanning particle microscope, for instance a scanning electron microscope, a scanning ion microscope, and/or a scanning probe microscope and a second measuring device can comprise an optical measuring system, for instance an AIMS™ or a PROVE® tool and/or a scanning probe microscope, for instance a scanning tunnelling microscope, a scanning force microscope or an atomic force microscope, a magnetic force microscope, an optical near-field microscope and/or an acoustic near-field microscope. This means that for example a particle beam, a photon beam, a magnetic or an acoustic interaction with the photomask and/or a measuring tip of a scanning probe microscope can be used for recording a first and/or a second image.

The at least one first image and the at least one second image can be recorded by one measuring device.

By way of example, a scanning particle microscope, an optical measuring system and/or a scanning probe microscope can record a first image of a defect before the repair thereof and a second image of a residue of the defect after the repair thereof. It is also possible for one or a plurality of the measuring devices mentioned to record a first image of a photolithographic mask before the beginning of the operational use thereof and to record a second image of the photolithographic mask after a specific duration of use of the photolithographic mask.

A photomask can have printable and non-printable defects. The method according to the invention can be used both for determining and for automatically representing printable and also non-printable defects. Since the non-printable defects of photolithographic masks are generally not treated, i.e. repaired, the present application preferably describes the superimposition of two or more images, wherein at least one image has at least one printable defect of a photolithographic mask.

The at least one first image can comprise an image averaged from two or more first images, and/or the at least one second image can comprise an image averaged from two or more second images. Furthermore, the at least one first image can be combined from two or more first images representing adjacent segments of the photolithographic mask, and wherein the two or more first images do not overlap, or only partly overlap. In addition, the at least one second image can be combined from two or more second images representing adjacent segments of the photolithographic mask, and wherein the two or more second images do not overlap, or only partly overlap.

The at least one second image can be synthesized from design data. The image synthesized from design data can appear like an image—measured by the first or the second measuring device—of a defect-free part or of a segment of a photomask which corresponds to the segment represented in the at least one first image. The at least one second image synthesized from design data has substantially no offset with respect to the design data.

Here and elsewhere in this description, the expression "substantially" denotes an indication of a measurement variable within the measurement uncertainty if measurement devices according to the prior art are used to measure the corresponding variable.

Synthesizing the at least one second image can comprise: Applying a trained transformation model for synthesizing the at least one second image from design data.

A transformation model can comprise at least two transformation blocks, wherein the at least two transformation blocks comprise at least one generically learnable function in each case, which convert inputs into outputs that are used as inputs for a subsequent transformation block. A generically learnable function of a transformation block can comprise at least one element from the group: a convolution block, a deconvolution block, a pooling block, a de-pooling block, a DenseBlock, ResBlock and InceptionBlock, an encoder and a decoder. The first transformation block of the transformation model can be provided with design data as input data and the at least one second transformation block supplies an image of one or a plurality of pattern elements of the photolithographic mask which appear as if they had been recorded by an AIMS™ or a PROVE® tool.

The transformation model can comprise a model of machine learning. The transformation model can comprise a neural network. The neural network can comprise a deep neural network. The transformation model can comprise a generative model. The generative model can comprise a deep generative model. The generative model can comprise a neural convolutional and deconvolutional network. A neural convolutional and deconvolutional network is referred to in English usage as a CNN (Convolutional Neural Network).

The at least one second image can comprise an image that is generated by an evaluation device. The at least one second image generated by the evaluation device can be referenced relative to the design data.

By virtue of the fact that an image generated by an evaluation device is referenced relative to the design data, this image can be superimposed on one or a plurality of images in the manner substantially free of errors. This possibility can advantageously be used, particularly when repairing defects of photolithographic masks, to illustrate in an image of the repaired location whether the defect repair process carried out was quantitatively successful or whether a further repair step is necessary to remove the defect residue that has remained to an extent such that the repaired location fulfils a predefined specification, for example a predefined critical dimension (CD).

The image generated by the evaluation device can comprise at least one slice which, along its longitudinal direction, determines an optical intensity profile of the photolithographic mask An image generated by an evaluation device and comprising an image which is derived from a measurement image and which contains one or a plurality of slice(s) is one example of a synthesized image generated by the evaluation device.

Determining the at least one first difference can comprise: generating at least one first binary image from the at least one first image, and/or determining the at least one second difference can comprise: generating at least one second binary image from the at least one second image. Transforming an image into a corresponding binary image makes it possible to extract the contour(s) of the image from the assigned binary image.

Generating the at least one first binary image and/or the at least one second binary image can comprise: applying a contrast-based metric to the at least one first image and/or the at least one second image.

The contrast-based metric can comprise at least one element from the group: an image contrast metric, an ILS (Image Log Slope) metric and a NILS (Normalized Image Log Slope) metric.

By applying a contrast-based metric, it is possible to ascertain a transition from bright to dark, or vice versa, in an aerial image with the greatest possible precision. As a result, it is possible to optimize the spatial resolution in the case of ascertaining defects.

The defined method can furthermore comprise the following step: generating a binary synthesized image from the synthesized image. A synthesized image can comprise a reference image with respect to the at least one first image and/or the at least one second image. As explained above, a synthesized image can be generated from design data for example with the aid of a transformation model. A reference image generated in this way represents a defect-free segment of a photolithographic mask. It appears like an image that was recorded by an optical measuring system. In order to be able to compare the reference image with the associated image which can have a defect, it is advantageous to convert the reference image and/or the synthesized image into a corresponding binary image.

Applying the contrast-based metric can comprise: stipulating a threshold value defining a transition from dark to bright in the at least one first image and/or the at least one second image. By stipulating a threshold value for an optical intensity distribution, the dimensions of the pattern elements in the binary image(s) of the first image and/or of the second image are defined.

The evaluation of a contrast-based metric is advantageous in particular for images that were recorded by an optical measuring system in the form of an AIMS™ or a PROVE® tool. These optical measuring devices measure aerial images. An aerial image describes the optical intensity distribution of a photolithographic exposure apparatus directly before the absorption thereof in a photoresist.

On account of the structures becoming smaller on photomasks, it is increasingly the case that not just one pattern element contributes to the image arising in the photoresist. Rather, the image arises in the photoresist from a convolution of a plurality of adjacent structure or pattern elements of the mask. An aerial image indicates how a photolithographic mask will image the pattern of a mask into the photoresist of the wafer, without the need to actually have to expose a wafer. An aerial image is thus very well suited to determining the actual imaging quality of a photomask at the actinic wavelength thereof.

In particular, from the aerial image of a mask, it is possible to ascertain the printable defects of said mask, i.e. the defects of said mask which result in a contravention of the specification of the structure elements projected in the photoresist or onto the wafer. The method defined above makes it possible to represent defects of a mask in an image of a repair device in an automated manner. Manual alignment of a binary image generated from an aerial image and containing a defect with, for example, an image of the defect generated by the repair device can be obviated. The automatic representation of a defect image in the image of the repair device makes it possible largely to exclude the influence of subjective criteria that inevitably occur during manual superimposition. As a result, it is possible to increase the positional accuracy of the repair device when carrying out a mask repair process.

Generating a binary image from at least one image measured by a scanning particle microscope can comprise: Applying a smoothing filter to the at least one measured image. Generating a binary image from at least one image measured by a scanning particle microscope can comprise: applying a contour filter to the at least one smoothed measured image. Generating a binary image from at least one image measured by a scanning particle microscope can comprise: defining a threshold value in order to transform the at least one contour-filtered, smoothed, measured image into a binary image. Generating a binary image from at least one image measured by a scanning particle microscope can comprise: making uniform a contour of at least one pattern element of the binary image.

In the simplest case, generating a binary image from at least one image measured by means of a scanning probe microscope can comprise applying a threshold value. However, it is also possible—in a manner similar to that described in the preceding claim—to use a threshold value in combination with one or a plurality of filters for generating a binary image from an image measured by a scanning probe microscope. By way of example, for this purpose it is possible to use a smoothing filter with subsequent application of a threshold value. In addition, in the first step a smoothing filter and in a second step a contour filter can be applied to the image(s) measured by a scanning probe microscope before a binary image is finally generated by threshold value formation.

Determining the at least one first difference can comprise: determining at least one first deviation of at least one pattern element of the first binary image from the at least one pattern element of the design data and/or determining the at least one second difference can comprise: determining at least one second deviation of at least one pattern element of the second binary image from the at least one pattern element of the design data.

Determining the at least one first difference can comprise: identifying coordinates of at least one pattern element in the at least one first binary image. Determining the at least one second difference can comprise: identifying the coordinates of at least one pattern element in the at least one second binary image.

Determining the at least one first difference can comprise: correlating the at least one first image with the design data corresponding to the at least one first image. Determining the at least one second difference can comprise: correlating the at least one second image with the design data corresponding to the at least one second image.

Correlating the at least one first image with the design data corresponding to the at least one first image can comprise: aligning at least one pattern element of the at least one first binary image with the corresponding pattern element of the design data. Correlating the at least one second image with the design data corresponding to the at least one second image can comprise: aligning at least one pattern element of the at least one second binary image with the corresponding pattern element of the design data.

Aligning the at least one pattern element of the at least one first binary image can comprise: determining a displacement, a rotation and/or a distortion of at least one pattern element of the at least one first binary image in relation to the at least one pattern element of the design data. Aligning the at least one pattern element of the at least one second binary image can comprise: determining a displacement, a rotation and/or a distortion of at least one pattern element of the at least one second binary image in relation to the at least one pattern element of the design data.

It is a great advantage of the method described that it takes into account not only a displacement of one or a plurality of pattern elements of an image during superimposition with a second image, but also a scaling, a rotation and/or a distortion of a binary image in relation to the corresponding design data or the two superimposed images.

Determining the at least one first difference can comprise: identifying the coordinates of the at least one pattern element of the design data which corresponds to the at least one pattern element of the at least one first binary image. Determining the at least one second difference can comprise: identifying the coordinates of the at least one pattern element of the design data which corresponds to the at least one pattern element of the at least one second binary image.

Determining the at least one first deviation can comprise: determining a coordinate difference between the at least one pattern element of the design data and the at least one pattern element of the first binary image, and/or determining the at least one second deviation can comprise: determining a second coordinate difference between the at least one pattern element of the design data and the at least one pattern element of the second binary image.

Superimposing the at least one first image and the at least one second image can comprise: aligning the at least one first image and the at least one second image with one another on the basis of the coordinates of one of the two assigned binary images and also the first coordinate difference and the second coordinate difference.

The first and second images can be superimposed on the basis of the coordinates of one of the two binary images, the first coordinate difference and the second coordinate difference of the two images in relation to the design data. In the general case, n images, where n≥2, can be superimposed by a coordinate difference in relation to the design data being ascertained for each of the n images. With the aid of the n coordinate differences ascertained, (n−1) images can be superimposed exactly on the coordinates of a selected i-th image. The n images can be recorded by a single imaging measuring device, for example at different points in time. However, it is also possible for the n images to be recorded by i different measuring devices or n different measuring devices, wherein it holds true that: 1≤i≤n.

Determining the at least one second difference between the at least one second image and the at least one first image can comprise: determining a drift of the measuring device in a time interval between recording the at least one first image and the at least one second image.

The measuring device can be for example part of a repair device for repairing photolithographic masks. The drift of the measuring device can be a drift of the repair device during a process of repairing a photolithographic mask.

By virtue of the fact that the image of a defect generated by a measuring device before carrying out a repair process is referenced relative to the design data, it is possible, by measuring the displacement or drift of the measuring device or repair device, for the image of the defect residue generated for example by the measuring device after carrying out a repair process to be specified in the coordinate system of the design data. As a result, the superimposition of a second image of the defect residue generated by means of a second measuring device, for example an optical measuring device, can be carried out in a simple manner and, in particular, exactly. The advantage of this procedure is that it is not necessary to generate a binary image from the second image of the measuring device after the defect repair.

It goes without saying that it is also possible, particularly if ascertaining the drift of the measuring device is very complex, to correlate the second image generated after the repair with the design data in order to represent this image relative to the coordinates of the design data. If superimposing the first image of the measuring device, i.e. for example the image of the defect in its original state, with other images of the measuring device or one or a plurality of images of a different measuring device is not necessary, it is sufficient to correlate the second image of the measuring device or repair device, i.e. after carrying out the repair process, with the design data.

Determining the at least one second difference can comprise: determining a difference between the synthesized second image and at least one measured second image.

A synthesized second image can comprise a reference image. The synthesized second image can comprise a reference aerial image recorded by an optical measuring device. The synthesized second image can comprise a reference image that is synthesized on the basis of an image of a scanning probe microscope by means of a trained transformation model. As already explained above, an image synthesized on the basis of design data has no coordinate displacement in relation to the design data. In order to determine the contour of a synthesized image, it is necessary, however, to transform a synthesized image into a binary synthesized image. In addition, an image synthesized on the basis of measurement data can have a coordinate displacement vis-à-vis the coordinates of the design data.

Ascertaining the at least one defect of a photolithographic mask can comprise: superimposing the aerial image of the at least one defect and the reference aerial image.

Determining the at least one second difference can comprise: determining a coordinate difference between at least one pattern element of the at least one binary measured second image and the at least one pattern element of the binary synthesized second image.

Determining the at least one second difference can comprise: Determining a coordinate difference between at least one pattern element of the at least one binary measured second image and the at least one pattern element of a binary measured reference image.

In order to detect a defect of a photolithographic mask, it may be necessary to compare an image, in particular a second image, with a reference image. A reference image can be measured by the measuring device that also measures the associated image. This can be for example an optical measuring device in the form of an AIMS™ or a PROVE® tool and/or a scanning probe microscope, such as a scanning force microscope, for instance. The optical measuring device can measure an aerial image and/or a reference aerial image. The reference image can be transformed into a binary reference image. If the reference image comprises a measured reference image, it is advantageous to relate the measured reference image to the design data, i.e. to correlate it with the design data.

The at least one second binary image can be correlated with the binary reference image. As a result of the correlation, the at least one second binary image and the binary reference image have a common coordinate system and can be superimposed exactly and in a reproducible manner. If the binary reference image and the binary second image are aerial images, this superimposition makes it possible to localize a defect or a defect residue of a photolithographic mask.

Since the coordinates of a binary aerial image are referenced relative to the design data, it is possible to superimpose the binary aerial image on the second image of the measuring device, which was recorded after the repair of the defect. Since the coordinates of the second image of the measuring device are likewise referenced relative to the coordinates of the design data, the superimposition can be carried out highly precisely and reproducibly. A scaling, a rotation and/or a distortion of the second image are/is taken into account automatically in the superimposition process.

The at least one first image can comprise at least one element from the group: an image of a scanning particle microscope recorded at a first point in time, a measured aerial image, and an image of a scanning probe microscope recorded at a first point in time, and the at least one second image can comprise at least one element from the group: an image of the scanning particle microscope recorded at a second time, a measured reference aerial image, an aerial image synthesized from design data, an image which is recorded by a first measuring device and, by means of a trained transformation model, is transformed into an image which appears as though it was recorded by a second measuring device, an image of the scanning probe microscope recorded at a second point in time, or an image synthesized by an evaluation device.

The at least one first image can comprise a first scanning particle microscope image which includes at least one defect of the photolithographic mask and which is recorded before a defect repair, wherein the at least one second image comprises a second scanning particle microscope image which includes a residue of the defect, and the method can furthermore comprise the following step: determining a drift of the second scanning particle microscope image in the time period between recording the first scanning particle microscope image and recording the second scanning particle microscope image and/or determining the at least one second difference of the second scanning particle microscope image can comprise: correlating the second image with the design data of the photolithographic mask.

The at least one first image can comprise an aerial image which includes at least one defect of the photolithographic mask and which is recorded after a defect repair, wherein the at least one second image comprises a reference aerial image which does not include a defect.

By virtue of an aerial image and/or a reference aerial image being referenced relative to design data, the evaluation of these images and thus the extraction of a defect of a photolithographic mask from these images can be automated and objectified.

Superimposing the at least one first image and the at least one second image can comprise: changing a transparency of the at least one first image and/or of the at least one second image, such that both the at least one first image and the at least one second image are visible in the superimposed image.

Superimposing the at least one first image and the at least one second image can comprise superimposing the at least one first image and the at least one second image in an automated manner.

The method can furthermore comprise the following step: determining at least one defect of the photolithographic mask from the superimposed image.

Furthermore, the method can comprise the following step: repairing the at least one defect by means of a particle beam-induced etching process and/or a particle beam-induced deposition process.

The repair device can comprise a modified scanning electron microscope. The repair device can comprise at least one charged particle beam and at least one precursor gas. The charged particle beam can be used both for examining a photolithographic mask and for initiating a local chemical etching reaction or deposition reaction. The charged particle beam can comprise an electron beam. The at least one precursor gas can comprise at least one etching gas and/or at least one deposition gas. Furthermore, the precursor gas can comprise at least one additive gas which is provided in parallel with the at least one etching gas or in parallel with the at least one deposition gas.

The method described above can be used both for ascertaining for the first time one or a plurality of defects of a photolithographic mask and for establishing success of a repair process for one or a plurality of defects of photolithographic masks.

A photolithographic mask can comprise a transmissive photomask, a reflective photomask or a template for nanoimprint lithography. A transmissive photomask can comprise a binary photolithographic mask, a phase shifting mask or a mask for multiple exposures. A reflective photomask can comprise a photomask for an extreme ultraviolet (EUV) wavelength range.

In one embodiment, a device for superimposing at least two images of a photolithographic mask comprises: (a) means for determining at least one first difference of at least one first image relative to design data of the photolithographic mask; (b) means for determining at least one second difference of at least one second image relative to design data of the photolithographic mask, or relative to the at least one first image; and (c) means for superimposing the at least one first image and the at least one second image taking account of the at least one first difference and the at least one second difference.

The device can be configured to carry out the method steps of the aspects described above.

The device can comprise a non-volatile memory for storing the design data of the photolithographic mask. In addition, the data for the at least one first image and the at least one second image can be stored in the non-volatile memory. In addition, the non-volatile memory of the device can store one or a plurality of superimposed images.

The device can comprise a repair device in the form of a modified scanning particle microscope. The modified scanning particle microscope can comprise a modified scanning electron microscope. The repair device can furthermore comprise one or a plurality of scanning probe microscopes. The scanning probe microscope can comprise a scanning force microscope or an atomic force microscope.

The device can furthermore comprise means for recording an aerial image of the photolithographic mask and/or of a reference image. The means for recording the aerial image and/or the reference aerial image can comprise an AIMS™ (Aerial Image Metrology System) and/or a PROVE® tool. The AIMS™ tool can comprise an EUV AIMS™ tool.

The means for superimposing at least two images can comprise a dedicated hardware component that is operationally able to carry out an algorithm for superimposing two or more images. The dedicated hardware component can comprise at least one element from the group: a special processor for image processing, an ASIC (Application Specific Integrated Circuit) and an FPGA (Field Programmable Gate Array).

The device can include a graphics processing unit (GPU) configured to implement a trained transformation model.

Many transformation models or models of machine learning can be optimized for the use of specific computing units in order to considerably accelerate their implementation. For DNN (Deep Neural Networks), by way of example, graphics processing units, in particular, have proved to be advantageous. The image size that can be calculated is typically limited by the available main memory. However, the image regions (FOV, Field Of View) customary in the imaging of photomasks are sometimes significantly larger than a size that can be handled by DNN with current GPUs. This problem can be solved by dividing the image to be calculated into partial regions. In this case, the partial regions of an image are calculated individually. This applies both to the training and to the application of the trained transformation model to design data. The calculated partial images are subsequently combined to form the overall image.

A computer program can comprise instructions that cause a computer system to carry out the method steps of the aspects described above when the computer system executes the computer program.

BRIEF DESCRIPTION OF DRAWINGS

The following detailed description describes currently preferred exemplary embodiments of the invention, with reference being made to the drawings, in which.

DETAILED DESCRIPTION

Currently preferred embodiments of the method according to the invention and of the device according to the invention for superimposing two or more images of a photolithographic mask are explained below. The method according to the invention and the device according to the invention are described below on the basis of the example of a binary photomask. However, they are not restricted to the examples described below. Rather, they can be used to analyze arbitrary types of defects of photomasks, in particular of photomasks for the extreme ultraviolet (EUV) wavelength range. As a person skilled in the art will recognize without difficulty, the method according to the invention and the device according to the invention can likewise be used for examining templates used in various types of nanoimprint lithography.

Furthermore, the method according to the invention and the device according to the invention are explained below on the basis of images originating from a repair device and an optical measuring device. However, the method according to the invention and the device according to the invention can be used for superimposing images recorded by all possible imaging measuring devices which use different measurement principles.

Moreover, a repair device according to the invention is described on the basis of a tool that uses an electron beam as an example of the charged particle beam for examining a photolithographic mask and for repairing a defect of the photomask. However, a repair device according to the invention need not necessarily use an electron beam for scanning the mask and as an energy source for initiating a local chemical process for repairing one or a plurality of defects of a photomask. It is also possible, for example, for the repair device to use a particle beam in the form of an ion beam and/or an atomic beam or a molecular beam or one or a plurality of photon beams alone or in combination with a particle beam for initiating a local etching and/or deposition process and for examining the photolithographic mask. In addition, a repair device can alternatively or additionally use a different principle for repairing one or a plurality of mask defects. By way of example, a scanning probe microscope embodied in the form of a scanning force microscope, for instance, can be used with a measuring tip to scan defects and/or to process mechanically defects of excess material.

Figure 1:
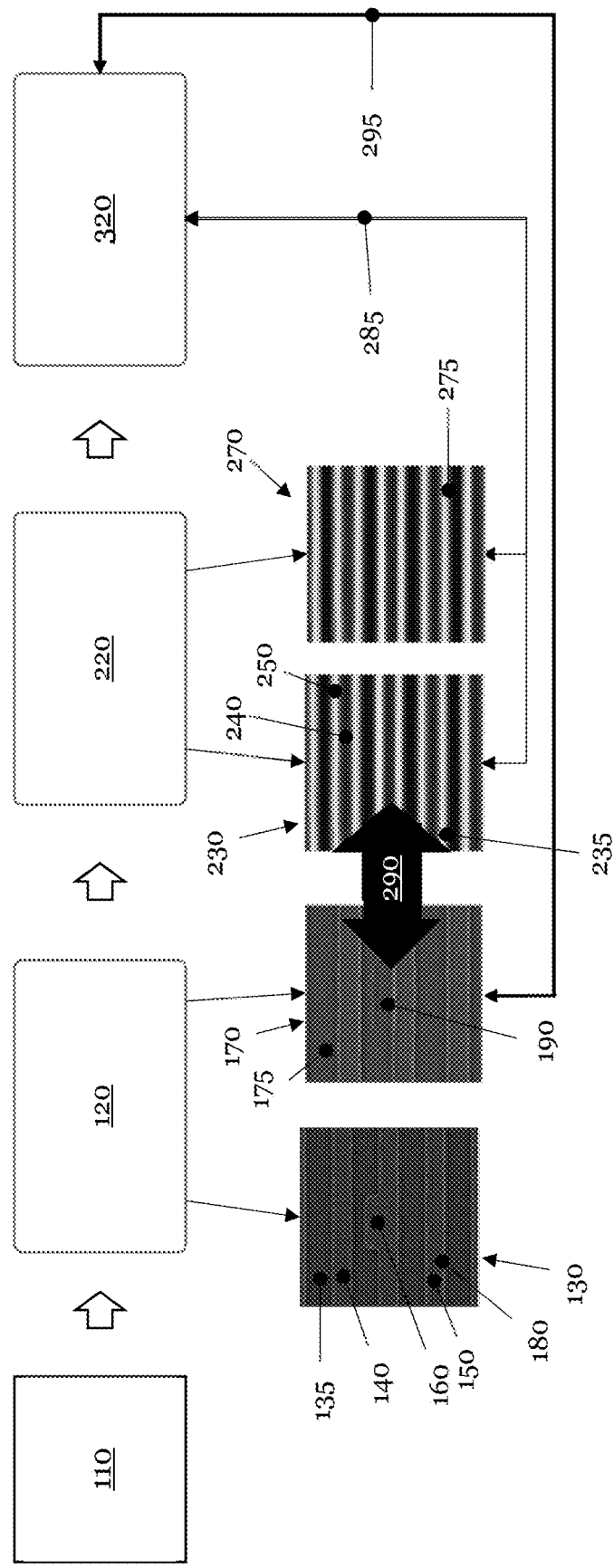
FIG. 1 schematically shows a device which makes it possible to automatically superimpose two or more images recorded by two different measuring devices, and makes it possible to automatically superimpose one or a plurality of images with a synthetic image generated by an evaluation device.

The diagram in FIG. 1 schematically shows by way of example a work sequence for repairing a defect 160 of a binary photomask 110, in which exact and reproducible superimposition of two images can be used at various points in order to improve the repair process by increasing the accuracy of defect localization. The sequence of the repair process is illustrated by the horizontal arrows in FIG. 1. The photomask 110 was examined for defects 160 in an upstream work step, not illustrated in FIG. 1. A defect map for the mask 110 was created from the analysis of the defects 160 found on the mask 110. For examining the defects 160 of a photolithographic mask 110, it is possible to use an optical measuring system; by way of example, it is possible to use an AIMS™ tool 220—presented below in the context of FIG. 3—in combination with an evaluation device 320 for this purpose. It is also possible to use the method described below for identifying one or a plurality of defects 160 of the photolithographic mask 110, i.e. to use it for the upstream process step mentioned above.

The photomask 110 together with the assigned repair map is introduced into a repair device 120. One example of a repair device 120 is presented in FIG. 4. This process is illustrated by the first horizontal arrow in FIG. 1. The bottom left partial image 130 of FIG. 1 shows a segment 135 of an image 130 of the photomask 110 having a line structure (referred to as: lines and spaces) composed of absorbent horizontal strips 140 applied on a substrate 150 of the mask 110. Furthermore, the image 130 of the photomask 110 has a defect 160 of excess material, i.e. a dark defect 160. It goes without saying that the device 200 described below can also identify and analyze a defect of missing material, for example missing absorbent material, and superimpose it automatically on an image recorded by the repair device 120, for example. An image 130 of a photomask 110 which has a defect 160 is also referred to hereinafter as region of interest (ROI) 130. Generally an ROI 130 denotes a region of a photomask 130 which is selected for carrying out a specific process or work operation within the limits of the ROI 130. A region of interest 130 can comprise only a part of the image 130 of the photomask 110. A region of interest 130 is preferably selected automatically. However, it is also possible to select a region of interest 130 manually. A region of interest 130 is determined by a reference point, for example its centroid or a corner, a length, a width and an orientation.

The image 130 representing the segment 135 of the photomask 110 was scanned by an electron beam of the repair device 120. In the scanning electron microscope (SEM) image 130 of the repair device 120, the strips 140 of absorbent material appear brighter than the substrate 150 of the photomask 110 and in a manner bounded by a bright edge 180.

The partial image 170 at the bottom second from the left in FIG. 1 shows the segment 135 of the SEM image 130 after a repair of the defect 160 by the repair device 120. The original defect 160 is still discernible only weakly in the SEM image 170. The repaired location 190 is also called defect residue 190 hereinafter.

What is crucial for assessing the repair of the defect 160, however, is not the appearance of the defect residue 190 in the SEM image 170 of the repair device 120, but rather the effect of the repaired location 190 or defect residue 190 during the exposure of a wafer. In the meantime the pattern or structure elements of photolithographic masks 110 have become so small and are being arranged so closely adjacently that two or more adjacent pattern elements of the photomask 110 can contribute to the image arising in the photoresist during an exposure of the mask 110.

In the next step of the repair sequence, in the example illustrated in FIG. 1, an optical measuring system 220 in the form of an AIMS™ tool 220 is used to record an aerial image 230 of the segment 135 of the photomask 110 which contains the repaired location 190 of the photomask 110. The AIMS™ tool 220 is described in FIG. 3 that follows.

The partial image 235 at the bottom second from the right presents an aerial image 230 of the image 130 or of the segment 135 of the repaired photomask 110 and thus corresponds to the partial image 170 at the bottom second from the left in FIG. 1. The aerial image 230 images the horizontal strips 140 of absorbent material of the photomask 110 in FIG. 1 as dark strips 240. The transparent substrate 150 of the photomask 110 is represented by the bright strips 250 in the aerial image 230.

In the example in FIG. 1, the aerial image 230 contains the image 130 or segment 135 of the repaired defect 160, i.e. the defect residue 190. However, it is also possible to image the segment 135 or the image 130 of the original defect 160 with an aerial image 230 (not illustrated in FIG. 1).

The bottom right partial image 275 of FIG. 1 shows an aerial image that was generated by the imaging of a defect-free line structure that is identical to the line structure in the partial images 135, 175 and 235. The aerial image in the bottom right partial image 275 thus reproduces a reference aerial image 270 showing the substantially defect-free image 130 or the segment 135 of the photomask 110.

The reference aerial image 270 can be measured with the aid of an AIMS™ tool 220. However, it is also possible to measure the reference aerial image 270 by means of a different measuring device and then to transform it into a reference image 270 with the aid of a trained transformation model. By way of example, an image of a defect-free line structure, said image being measured by the repair device 120 and/or a scanning probe microscope 480, can be used as input data for a trained transformation model. Furthermore, a reference aerial image 270 can be generated by an AIMS™ tool 220 measuring an aerial image of the defect-free line structure at a wavelength that does not correspond to the actinic wavelength of the photomask 110. A trained transformation model can transform the measured reference aerial image into the reference aerial image 270 which appears as if it had been measured at the actinic wavelength of the photomask 110. Moreover, a trained transformation model can synthesize a reference aerial image 270 on the basis of design data as input data.

The transformation model can comprise at least two transformation blocks, wherein the at least two transformation blocks comprise at least one genetically learnable function in each case, which convert inputs into outputs that are used as inputs for a subsequent transformation block. The first transformation block of the transformation model can be provided with design data of the photolithographic mask 110 as input data and the at least one second transformation block supplies an image of one or a plurality of pattern elements of the photolithographic mask 110 which appear as if they had been recorded by an AIMS™ tool 220.

The transformation model can comprise a model of machine learning. The transformation model can comprise a neural network. The neural network can comprise a deep neural network (DNN). The transformation model can comprise a generative model. The generative model can comprise a deep generative model. The generative model can comprise a neural convolutional and deconvolutional network. A neural convolutional and deconvolutional network is referred to in English usage as a CNN (Convolutional Neural Network).

As symbolized by the double-headed arrow 290 in FIG. 1, in order to improve the repair process an aim is to superimpose the aerial image 230 recorded by the AIMS™ tool 220 on the image 170 recorded by the repair device 120. For this purpose, the repair device 120 communicates the image 170 and/or the image 130 to the evaluation device 320 via the connection 295. Furthermore, the AIMS™ tool 220 transmits the aerial image 230 and the measured reference aerial image 270 to the evaluation device 320. This process is illustrated by the arrow 285 in FIG. 1. In an alternative embodiment, not illustrated in FIG. 1, the evaluation device 320 synthesizes a reference aerial image 270 from the design data of the photolithographic mask 110.

In the example reproduced in FIG. 1, it is also possible, of course, to superimpose the two images 130 and 170 of the repair device 120 and/or the aerial image 230 with the reference aerial image 270 with the aid of the method described below. Moreover, the image 130 of the repair device 120 can be correlated with the reference aerial image 270. Finally, the images 130 and 170 of the repair device 120 can be superimposed on the aerial image 230 and the reference aerial image 270.

In an alternative embodiment, the repair device 120 in FIG. 1 can be realized by a scanning probe microscope 480 (not shown in FIG. 1). In a further alternative embodiment, the AIMS™ tool 220 can be replaced by a scanning probe microscope 480.

Figure 2:
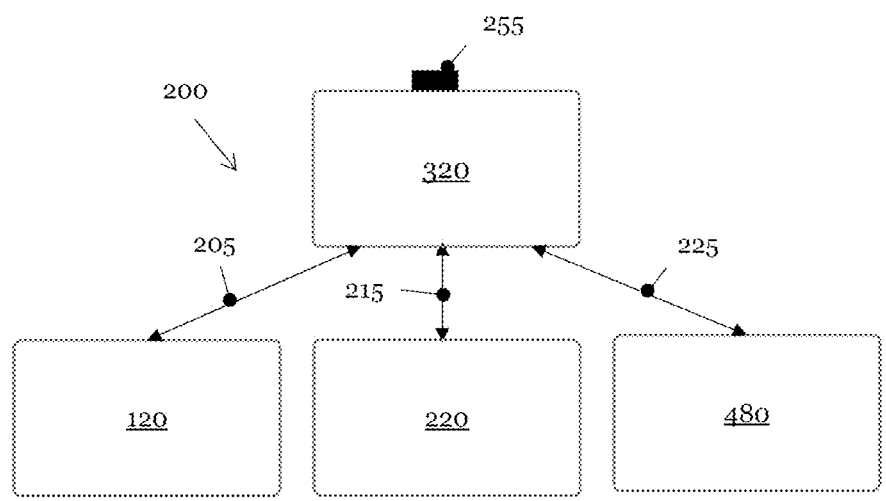
FIG. 2 schematically illustrates a device comprising a repair device for a photolithographic mask, an optical measuring system in the form of an AIMS™ tool, a scanning probe microscope, and also an evaluation device.

FIG. 2 schematically presents, in the form of a block diagram, an example of a device 200 for superimposing two or more images, e.g., 130, 170, 230, 270, of a photolithographic mask 110. The device 200 can also be used for highly precisely repairing one or a plurality of defects 160 of a photomask 110. In this example, the exemplary device 200 comprises four essential components. These are a repair device 120, an optical measuring system 220 for measuring an aerial image 230, 270, for example an AIMS™ tool 220, a scanning probe microscope 480 and the evaluation device 320. The evaluation device 320 can be embodied in the form of a dedicated hardware component (not shown in FIG. 2). The dedicated hardware component can comprise a specific processor, for instance a processor for image processing. It is also possible for the dedicated hardware component to be embodied in the form of an ASIC (Application Specific Integrated Circuit) or an FPGA (Field Programmable Gate Array). Furthermore, the evaluation device 320 can be realized in a combination of hardware, software and/or firmware. Other implementations of devices for superimposing two or more images (e.g., 130, 170, 230, 270) of a photolithographic mask (e.g., 110) may include components that are different from those shown in FIG. 2. For example, the devices can have more or fewer components than those shown in FIG. 2. For example, the scanning probe microscope 480 can be replaced by another type of microscope.

The evaluation device 320 in FIG. 2 is connected to the repair device 120 via the connection 205, to the AIMS™ tool 220 via the connection 215 and to the scanning probe microscope 480 via the connection 225. Furthermore, the repair device 120, the AIMS™ tool 220 and the scanning probe microscope 480 can have direct connections among one another, which are not reproduced in FIG. 2. The connections 205, 215 and 225 are bidirectional connections and can be embodied in wired or wireless form. In particular, the connections 205, 215 and 225 can be embodied at the physical level in the form of coaxial lines or as fiber-optic connections. The evaluation device 320 can be at a relatively large spatial distance from the repair device 120, the AIMS™ tool 220, and/or the scanning probe microscope 480. A relatively large spatial distance can encompass a range of from a few meters to hundreds of kilometers. For example, the evaluation device 320 can be implemented based on a cloud computer.

The evaluation device 320 can obtain measurement data in the form of image data or images 130, 170, 230, 270 from at least two of the three measuring devices 120, 220, 480 and can store the images 130, 170, 230, 270 in a non-volatile memory, not illustrated in FIG. 2. Thus, spatially and temporally independently of the measuring devices 120, 220, 480 the evaluation device 320 can carry out the superimposition of two or more images 130, 170, 230, 270 in an automated form. Consequently, the evaluation device 320 is designed to decouple the measuring devices 120, 220, 480 from the superimposition process and the image evaluation process associated therewith and thus to relieve the burden on said measuring devices. The connections 205, 215, 225 of the evaluation device 320 to the measuring devices 120, 220, 480 are embodied in bidirectional fashion, such that the evaluation device 320 can transmit one or a plurality of superimposed images for representation on the respective screen of the corresponding measuring device 120, 220, 480. Alternatively, the evaluation device 320 can transmit one or a plurality of processed images to one or a plurality of measuring devices 120, 220, 480 for representation on the screen of the corresponding measuring device 120, 220, 480. Additionally, or alternatively, via the interface 255, the evaluation device 320 can transmit one or a plurality of the superimposed images to one or a plurality of external monitors or screens, not reproduced in FIG. 2. In addition, the evaluation device 320 can be controlled externally via the interface 255.

The three measuring devices 120, 220, 480 in FIG. 2 are merely by way of example. As explained during the discussion of FIG. 1, two different measuring devices 120, 220 can be used in a typical defect repair process. In contrast to the illustration shown in FIG. 2, however, the evaluation device 320 can also obtain measurement data for more than the three measuring devices 120, 220, 480, which measurement data can be represented in the form of image data or images (not reproduced in FIG. 2).

In the example illustrated in FIG. 2, the evaluation device 320 is embodied as an independent unit. However, it is also possible to integrate the evaluation device 320 into the repair device 120, the AIMS™ tool 220 and/or the scanning probe microscope 480 (not illustrated in FIG. 2).

Figure 3:
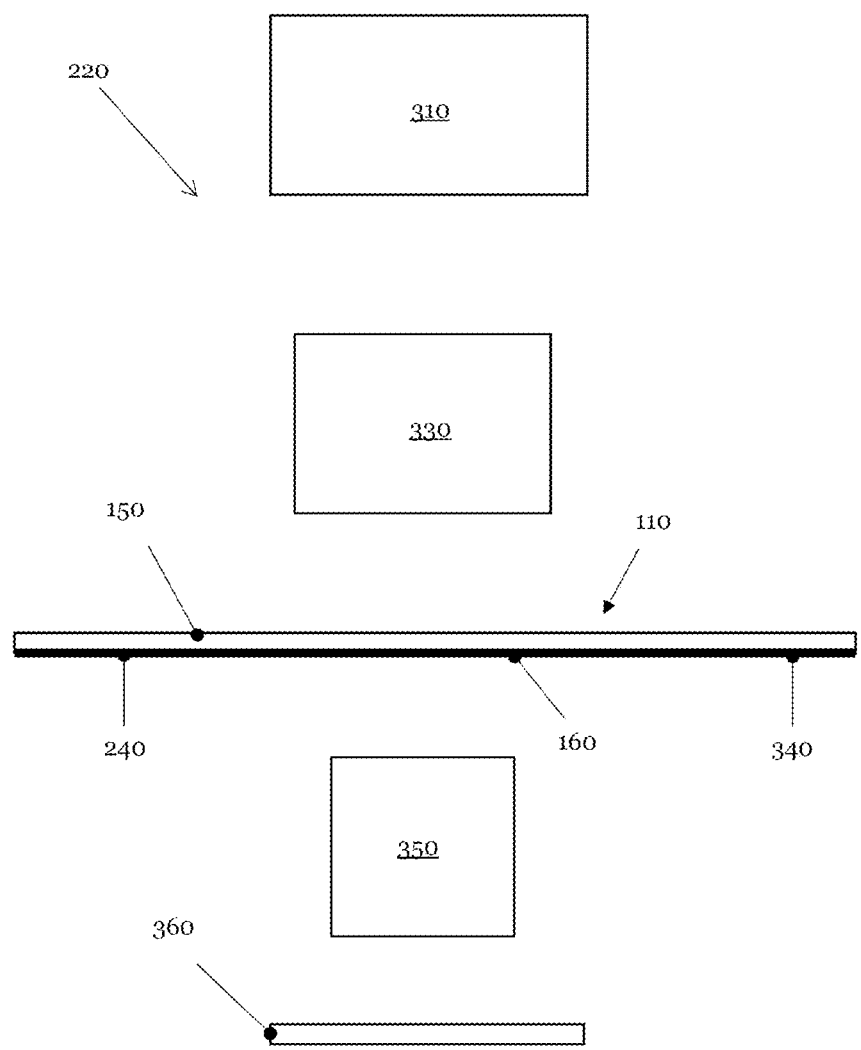
FIG. 3 shows, in a schematic sectional view, some components of an AIMS™ that measures a transmissive photolithographic mask.

FIG. 3 schematically shows some components of an example of an optical measuring system 220 which is embodied in the form of an AIMS™ (Aerial Image Metrology System) tool 220 and can measure an aerial image 230 and/or a reference aerial image 270 of a photolithographic mask. The AIMS™ tool 220 has a light source 310, which typically comprises a laser system. By way of example, an argon fluoride laser system can be used for this purpose, which emits electromagnetic radiation at a wavelength of 193 nm. The light source 310 thus makes it possible to measure the photolithographic mask 110 at the actinic wavelength thereof.

However, it is also possible to use for the light source 310 a radiation source that uses electromagnetic radiation for example in a wavelength range of 10 nm to 20 nm, for instance at 13.5 nm. An EUV AIMS™ tool can be used for analyzing a reflective EUV mask (not illustrated in FIG. 3). In addition, the AIMS™ tool 220 can use a light source 310 that does not emit at the actinic wavelength of the photomask 110. A trained transformation model can be used in this case in order to transform an aerial image generated by the AIMS" tool 220 and/or a measured reference aerial image into an aerial image 230 and/or a reference aerial image 270 which appear(s) similar to an aerial image and/or a reference aerial image which are/is measured at the actinic wavelength of the photomask 110.

A lens 330 directs the radiation of the light source 310 onto a photolithographic mask, which can be the binary photomask 110 from FIGS. 1 and 2. The lens 330 can contain transmissive or reflective optical components depending on the wavelength of the light source 310 of the AIMS™ tool 220. In some implementations, the light source 310, the lens 330 and a sample holder, not reproduced in FIG. 3, form essential components of an exposure system of a photolithographic exposure apparatus. Other implementations of an exposure system of a photolithographic exposure apparatus may have components that are different from those shown in FIG. 3. For example, the exposure system can have more or fewer components than those shown in FIG. 3.

The exemplary mask in FIG. 3 is the binary photomask 110 from FIGS. 1 and 2. The mask 110 has a substrate 150, which is substantially optically transparent to the wavelength of the light source 310. The photomask 110 has absorbent lines 240 in the form of a line pattern. In addition, the mask 110 typically has pattern or structure elements 340, which image a predefined pattern into a photoresist arranged on a substrate or a wafer (not shown in FIG. 3).

Downstream of the mask 110 a photolithographic exposure apparatus comprises a projection lens, which images the pattern of the mask 110 in a reduced fashion into the photoresist arranged on a wafer. In an AIMS™ tool 220, the projection lens is replaced by a magnifying lens 350 (e.g.: 450x). Instead of a wafer, the lens 350 images the lines 240 of the line pattern or the pattern elements 340 of the pattern 340 of the photomask 110 onto a detector 360. The detector 360 can comprise a CCD (charge-coupled device) camera, for example. The image or the image segment that the detector 360 captures from the shadow casting of the mask 110 in the plane in which the mask 110 is arranged in a photolithographic exposure apparatus is referred to as aerial image 230. An AIMS™ tool 220 makes it possible to examine the imaging behaviour of a photolithographic mask 110 in an exposure system of a photolithographic exposure apparatus, without a wafer having to be exposed and analyzed for this purpose.

Figure 4:
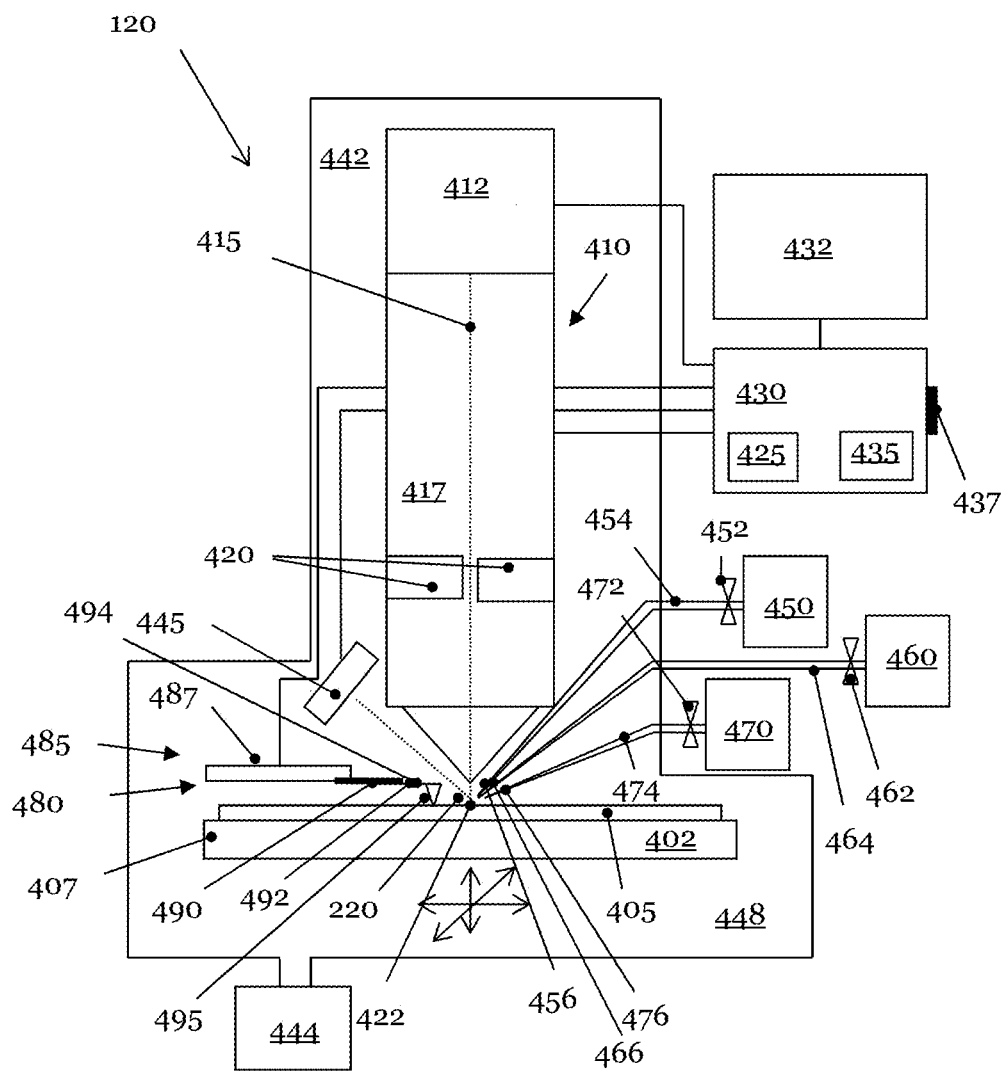
FIG. 4 presents, in a schematic sectional view, some components of a repair device for a photolithographic mask.

FIG. 4 shows a schematic sectional view through some important components of one example of a repair device 120 which can be used to identify and repair a defect 160 of a photolithographic mask 110. A sample 405 can be arranged in the form of a photolithographic mask 110, for example, on the sample stage 402. The photomask 110 can have one or a plurality of defects 160 in the form of excess material ("dark defects") and/or missing material ("clear defects"). The defect 160 of the photolithographic mask 110 is not reproduced in FIG. 4. The defect 160 or generally defects of excess or missing material can be scanned and thus analyzed with the aid of a particle beam and/or with the aid of a measuring tip of a scanning probe microscope 480. Furthermore, defects 160 can be corrected by means of particle beam-induced processing process. For this purpose, the repair device 120 comprises a modified scanning particle microscope 410 in the form of a scanning electron microscope (SEM, Scanning Electron Microscope) 410. Moreover, defects 160 of excess material can be repaired by means of a measuring tip of a scanning probe microscope 480. Therefore, the repair device 120 comprises one or a plurality of scanning probe microscopes 480 typically in the form of an atomic force microscope (AFM, Atomic Force Microscope) 480.

In the SEM 410 in FIG. 4, an electron gun 412 generates an electron beam 415, which the imaging elements arranged in the electron column 417, said imaging elements not being illustrated in FIG. 4, direct as a focused electron beam 415 onto the sample 405 at the location 422, which sample—as already explained—can comprise the mask 110 from FIG. 1. The sample 405 is arranged on a sample stage 402 or a sample mount 402. A sample stage 402 is also known as a "stage" in the art. As symbolized by the arrows in FIG. 4, a positioning unit 407 can move the sample stage 402 about six axes relative to the column 417 of the SEM 410. The movement of the sample stage 402 by the positioning unit 407 can be effected with the aid of micromanipulators, for example, which are not shown in FIG. 4.

At the measurement point 422, the particle beam 415 impinges on the sample 405, for instance the photomask 110. Thus, the positioning system 407, by virtue of the displacement of the sample stage 402 perpendicularly to the beam axis of the electron beam 415, makes it possible firstly to analyze defects 160 of the photomask 110 by generating an image of the defect 160. For this purpose, the imaging elements of the column 417 of the SEM 410 can scan the electron beam 415 over the sample 405. By means of the tilting and/or rotation of the sixth-axis sample stage 402, the latter makes it possible to examine one or a plurality of defects 160 from different angles or perspectives. The respective position of the various axes of the sample stage 402 can be measured by interferometry (not reproduced in FIG. 4). The positioning system 407 is controlled by signals of a control unit 425. The control unit 425 can be part of a computer system 430 of the repair device 120.

The repair device 120 can furthermore comprise sensors that make it possible to characterize both a current state of the SEM 410 and the process environment in which the SEM 410 is used (for instance a vacuum environment).

The electron beam 415 can furthermore be used for inducing a particle beam-induced processing process for correcting identified defects 160 for example in the context of an electron beam-induced etching process EBIE (Electron Beam Induced Etching) for removing dark defects 160 and/or an electron beam-induced deposition process EBID (Electron Beam Induced Deposition) for correcting clear defects. In addition, in the repair device 120 in FIG. 4, the electron beam 415 can be used for analyzing a repaired location 190 of a photomask 110, as is illustrated in the image 170 at the bottom second from the left in FIG. 1.

The electrons backscattered from the electron beam 415 by the sample 405 and the secondary electrons produced by the electron beam 415 in the sample 405 are registered by the detector 420. If the sample 405 comprises the photomask 110, the detector 420 identifies secondary electrons emitted during the scanning of the absorbent strips 140. The detector 420 that is arranged in the electron column 417 is referred to as an "in lens detector." The detector 420 can be installed in the column 417 in various embodiments. The detector 420 can also be used for detecting the electrons backscattered from one or a plurality of defects 160 of the mask 110. The detector 420 is controlled by a control unit 425 of a computer system 430 of the device 120.

The repair device 120 can include a second detector 445. The second detector 445 is designed to detect electromagnetic radiation, particularly in the x-ray range. As a result, the second detector 445 makes it possible to analyze the material composition of the mask 110, i.e. the substrate 150 thereof, the absorbent strips 140, and/or one or a plurality of defects 160. The detector 445 is likewise controlled by the control unit 425.

The control unit 425 of the computer system 430 can set the parameters of the electron beam 415 for inducing a deposition process for removing clear defects and/or an EBIE process 300 for etching dark defects.

Furthermore, the computer system 430 of the repair device 120 has an evaluation unit 435. The evaluation unit 435 receives the measurement data of the detector(s) 420, 445. The evaluation unit 435 can generate from the measurement data, for example from secondary electron contrast data, images 130, 170 in a greyscale representation or a greyscale value representation, which are represented on a monitor 432. In addition, the computer system 430 comprises an interface 437, via which the computer system 430 or the evaluation unit 130, 170 can transmit to the evaluation device 320. Furthermore, the computer system 430 of the repair device 120 can receive one or a plurality of processed or evaluated images and/or one or a plurality of superimposed images from the evaluation device.

As already explained above, the electron beam 415 of the modified SEM 410 can be used for inducing an electron beam-induced processing process. As likewise already explained above, defects 160 of the sample 405 or of the photomask 110 can be corrected by means of an electron beam-induced processing process. In order to carry out these processes, the exemplary scanning electron microscope 410 of the repair device 120 in FIG. 4 has three different supply containers 450, 460 and 470.

The first supply container 450 stores a first precursor gas in the form of a deposition gas, for example a metal carbonyl, for instance chromium hexacarbonyl ($Cr(CO)_6$), or a carbon-containing precursor gas, such as pyrene, for instance. With the aid of the precursor gas stored in the first supply container 450, material can be deposited on the sample 405 or the mask 110 in a local chemical reaction, with the electron beam 415 of the SEM 410 acting as an energy supplier in order to split the precursor gas stored in the first supply container 450 preferably into chromium atoms and carbon monoxide molecules at the location at which the material is intended to be deposited, i.e. at a location of a clear defect. This means that an EBID process for correcting defects of the photomask 110 is carried out by the combined provision of an electron beam 415 and a precursor gas. The modified SEM 410 in combination with the first supply container 450 or the deposition gas stored therein forms a repair device 120.

In the repair device 120 illustrated in FIG. 4, the second supply container 460 stores a precursor gas in the form of an etching gas, which makes it possible to perform a local electron beam induced etching (EBIE) process. Defects of excess material 160 or dark defects 160 can be removed from the photolithographic mask 110 with the aid of an electron beam-induced etching process. A precursor gas in the form of an etching gas can comprise for example xenon difluoride ($XeF_2$), chlorine ($Cl_2$), oxygen ($O_2$), ozone ($O_3$), water vapour ($H_2O$), hydrogen peroxide ($H_2O_2$), dinitrogen monoxide ($N_2O$), nitrogen monoxide (NO), nitrogen dioxide ($NO_2$), nitric acid ($HNO_3$), ammonia ($NH_3$) or sulfur hexafluoride ($SF_6$) or a combination thereof. Consequently, the modified SEM 410 in combination with the second supply container 460 or the precursor gas stored therein forms a repair device 120.

An additive gas can be stored in the third supply container 470, said additive gas, where necessary, being able to be added to the etching gas kept available in the second supply container 460 or to the deposition gas stored in the first supply container 450. Alternatively, the third supply container 470 can store a precursor gas in the form of a second deposition gas or a second etching gas.

In the scanning electron microscope 410 illustrated in FIG. 4, each of the supply containers 450, 460 and 470 has its own control valve 452, 462 and 472 in order to monitor or control the amount of the corresponding gas that is provided per unit time, i.e., the gas volumetric flow at the location 422 of the incidence of the electron beam 415 on the sample 405. The control valves 452, 462 and 472 are controlled and monitored by the control unit 425. By this means, it is possible to set the partial pressure conditions of the gas or gases provided at the processing location 422 for carrying out an EBID and/or EBIE process in a wide range.

Furthermore, in the exemplary SEM 410 in FIG. 4, each supply container 450, 460 and 470 has its own gas feedline system 454, 464 and 474, which ends with a nozzle 456, 466 and 476 in the vicinity of the point of incidence 422 of the electron beam 415 on the sample 405.

The supply containers 450, 460 and 470 can have their own temperature setting element and/or control element, which allows both cooling and heating of the corresponding supply containers 450, 460 and 470. This makes it possible to store and in particular provide the precursor gases of the deposition gas and/or the etching gas at the respectively optimum temperature (not shown in FIG. 4). The control unit 425 can control the temperature setting elements and the temperature control elements of the supply containers 450, 460 and 470. During the EBID and the EBIE processing processes, the temperature setting elements of the supply containers 450, 460 and 470 can furthermore be used to set the vapour pressure of the process gas(es) stored therein by way of the selection of an appropriate temperature.

The device 400 can comprise more than one supply container 450 in order to store precursor gases of two or more deposition gases. Furthermore, the device 400 can comprise more than one supply container 460 for storing precursor gases of two or more etching gases.

The scanning electron microscope 410 illustrated in FIG. 4 can be operated under ambient conditions or in a vacuum chamber 442. Implementing the EBID and EBIE processes necessitates a negative pressure in the vacuum chamber 442 relative to the ambient pressure. For this purpose, the SEM 410 in FIG. 4 comprises a pump system 444 for generating and for maintaining a negative pressure required in the vacuum chamber 442. With closed control valves 452, 462 and 472, a residual gas pressure of <10⁻⁴ Pa is achieved in the vacuum chamber 442. The pump system 444 can comprise separate pump systems (not shown in FIG. 4) for the upper part of the vacuum chamber 442 for providing the electron beam 415 of the SEM 410 and for the lower part 448 or the reaction chamber 448.

The SEM 410 presented in the repair device 120 in FIG. 4 has a single electron beam 415. However, it is also possible for the SEM 410 to have a source of a second particle beam. The second particle beam can comprise a photon beam and/or an ion beam (not shown in FIG. 4). Furthermore, the SEM 410 can have two or more electron beams 415 in order to be able to carry out in parallel two or more particle beam-induced processing processes or two or more analysis processes of two or more defects 160.

Additionally, the exemplary repair device 120 illustrated in FIG. 4 comprises a scanning probe microscope 480 which, in the repair device 120, is embodied in the form of a scanning force microscope (SFM) 480 or an atomic force microscope (AFM) 480. The scanning probe microscope 480 can be used for scanning one or a plurality of defects 160 of the sample 405 or of the photomask 110. Moreover, the scanning probe microscope 480 can be used for repairing the defects 160 of excess material. For this purpose, the scanning probe microscope 480 can comprise a first measuring tip for analyzing the sample 405 and a second measuring tip for processing one or a plurality of defects.

Only the measuring head 485 of the scanning probe microscope 480 is illustrated in the repair device 120 in FIG. 4. In the example in FIG. 4, the measuring head 485 comprises a holding device 487. The measuring head 485 is secured to the frame of the repair device 120 by means of the holding device 487 (not shown in FIG. 4). A piezo-actuator 490 which enables a movement of the free end of the piezo-actuator in three spatial directions (not illustrated in FIG. 4) is attached to the holding device 487 of the measuring head 485. A probe 492 comprising a cantilever 494 or lever arm 494 and a measuring tip 495 is secured to the free end of the piezo-actuator 490. The free end of the cantilever 494 of the probe 492 has the measuring tip 495.

The control unit 425 of the computer system 430 can move the holding device 487 of the measuring head 485 of the AFM 480. It is furthermore possible for the control unit 425 to perform a coarse positioning of the sample 405 or the photomask 110 in height (z-direction) and for the piezo-actuator 490 of the measuring head 485 to perform a precise height setting of the AFM 480.

In the repair device 120, the scanning probe microscope 480 can alternatively or additionally be used for scanning defects 160. The repair device 120 can use two or more scanning probe microscopes 480. The scanning probe microscopes 480 can be of the same type or can be realized as different types of scanning probe microscope.

In the example illustrated in FIG. 4, the scanning probe microscope 480 is integrated into the repair device 120 and is controlled by the computer system 430 of the repair device 120. It is also possible, of course, for the scanning probe microscope to be embodied as an independent unit (not shown in FIG. 4).

Figure 5:
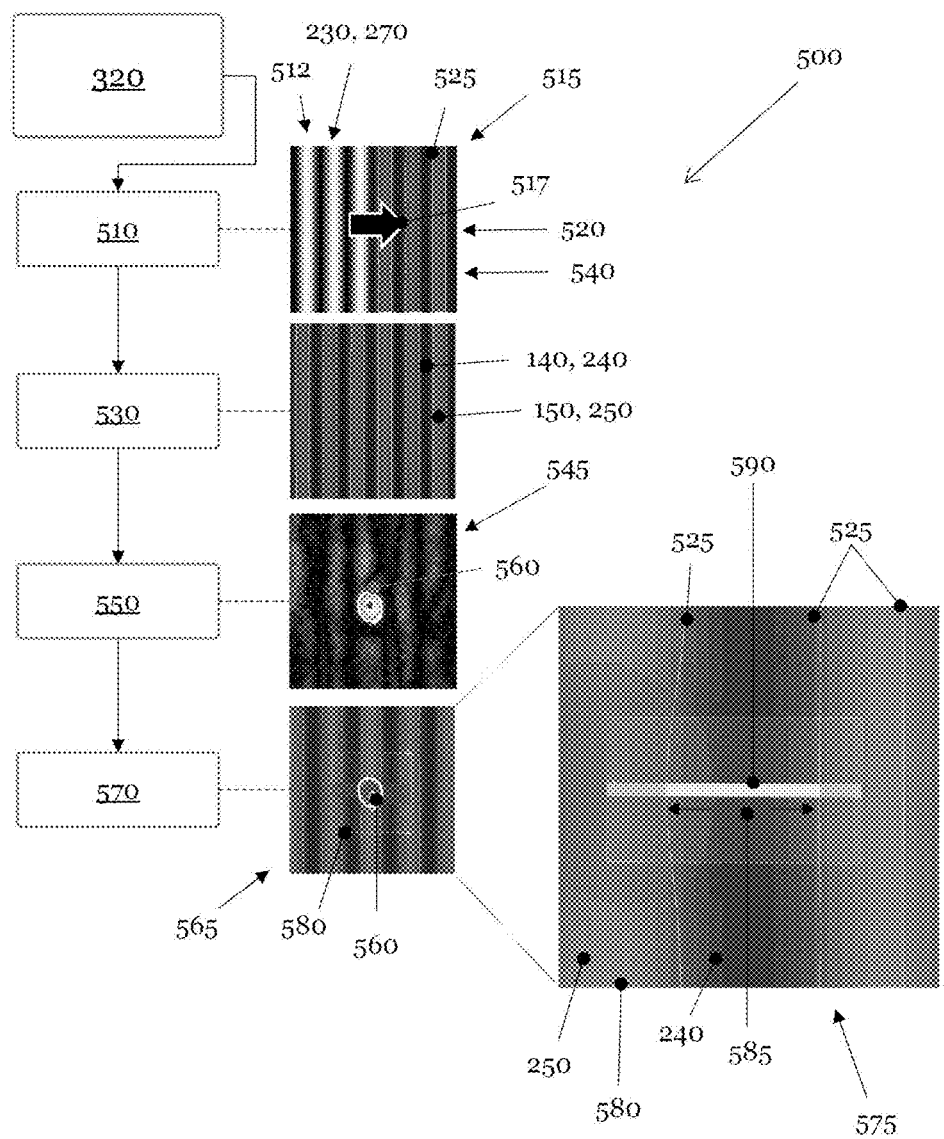
FIG. 5 illustrates in schematic form some steps of the evaluation of an aerial image or respectively of a reference aerial image by an evaluation device for determining a binary image of the aerial image and a binary reference aerial image from the reference aerial image, and the evaluation of a defect of the aerial image.

The diagram 500 in FIG. 5 schematically presents, in some implementations, essential evaluation steps necessary to generate a binary aerial image 520 or respectively a binary reference aerial image 540 from an aerial image 230 or respectively a reference aerial image 270 and to analyze a defect 160 of the aerial image 230 on the basis of the binary aerial image 520 and the binary reference aerial image 540. This evaluation or analysis process can be carried out by the evaluation device 320. The first step 510 involves analyzing the greyscale representation 512 of the aerial image 230 on the basis of a contrast-based metric. A contrast-based metric can be defined for example by stipulating an image contrast:

$$\text{image contrast} = \frac{I_{max} - I_{min}}{I_{max} + I_{min}},$$

herein $I_{max}$ and $I_{min}$ denote the maximum value and the minimum value, respectively, of the optical intensity of the aerial image 230 of the binary mask 110. For the evaluation of the aerial image 230 of the defect 160 or of the defect residue 190 and/or of the reference aerial image 270, it is more expedient, however, to choose an ILS (Image Log Slope) or an NILS (Normalized Image Log Slope) metric. The former is defined by:

$$\text{Image Log-Slope} = \frac{d\ln(I)}{dx} = \frac{1}{I} \cdot \frac{dI}{dx},$$

and the latter is defined by:

$$\text{Normalized Image Log-Slope} = w \cdot \frac{d\ln(I)}{dx},$$

wherein x is a direction perpendicular to a pattern element 340 or respectively to an absorbent strip 240 and wherein w describes the nominal width of the absorbent strip 240 or respectively of a pattern element 340.

Other implementations of a process for generating a binary aerial image (e.g., 520) or respectively a binary reference aerial image (e.g., 540) from an aerial image (e.g., 230) or respectively a reference aerial image (e.g., 270) and to analyze a defect (e.g., 160) of the aerial image (e.g., 230) on the basis of the binary aerial image (e.g., 520) and the binary reference aerial image (e.g., 540) may include steps different from those shown in FIG. 5. For example, the other implementations may include more or fewer steps than those shown in FIG. 5.

In the contrast-based metric, a threshold value is stipulated which specifies an optical intensity value in the aerial image 230 or respectively the reference aerial image 270 for which a transition from bright to dark, or vice versa, takes place in the binary photomask 110 from FIGS. 1 and 2. The threshold value thus defines the size of pattern elements 340 of the photomask 110 by virtue of the threshold value dividing an aerial image 230, 270 into printing and non-printing regions of the photomask 110. The arrow 517 in the partial image 515 of FIG. 5 illustrates the transition from the greyscale image 512 or equivalently from the aerial image 230 or respectively from the reference aerial image 270 to the binary image 520 or respectively the binary aerial image 520 of the aerial image 230 or respectively to the binary image 540 or respectively the binary reference aerial image 540 of the reference aerial image 270 of the partial image 515. The bright lines 525 mark the edges 525 of the strips 240 of the strip pattern from FIGS. 1 and 2 or generally of the pattern elements 340 of the photomask 110. In FIG. 5 images of the photomask 110 are rotated by 90° in relation to FIGS. 1 and 2.

Figure 6:
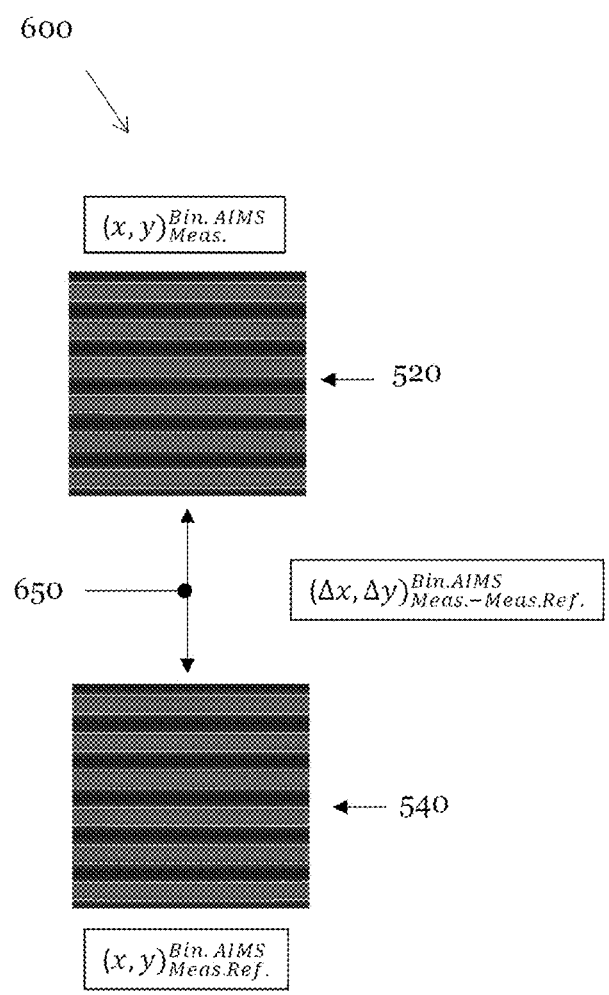
FIG. 6 illustrates in schematic form the correlation of a binary aerial image with a binary reference aerial image.

If necessary, the binary image 520 of the aerial image 230 and/or the binary image 540 of the reference aerial image 270 are/is scaled in step 530 in FIG. 5. The binary images 520, 540 of the aerial image 230 and of the reference aerial image 270 are subsequently correlated with one another. The correlations can be effected in various ways illustrated schematically in FIGS. 6 to 8. The diagram 600 in FIG. 6 shows the correlation of the binary aerial image 520 with a binary measured reference aerial image 540. The binary aerial image 520 has the following coordinates in the AIMS™ tool 220: $(x, y)_{Meas.}^{Bin.AIMS}$, wherein the indices indicate that the binary aerial image 520 was derived from a measured aerial image 230, as described above. The binary reference aerial image 540 has the following coordinates in the AIMS™ tool 220: $(x, y)_{Meas.Ref}^{Bin.AIMS}$, wherein the indices describe that the binary reference aerial image 540 is based on a measured reference aerial image 270. The coordinates (x, y) refer in each case to a fixed point in the binary images 520, 540. This may be for example a bottom left corner or the image center of the binary images 520, 540.

The binary aerial image 520 and the binary reference aerial image 540 are correlated, i.e. superimposed, by the coordinate difference $(\Delta x, \Delta y)_{Meas-Meas.Ref.}^{Bin.AIMS}$ of the binary images 520 and 540 being minimized. The scaling of one or both images 520, 540 results in the sizes of the structure or pattern elements 240, 340 of the two binary images 520, 540 being adapted to one another. A possible rotation of the two binary images 520, 540 or a distortion of one or both binary images 520, 540 is not taken into account, however, in the correlation process 650.

Figure 7:
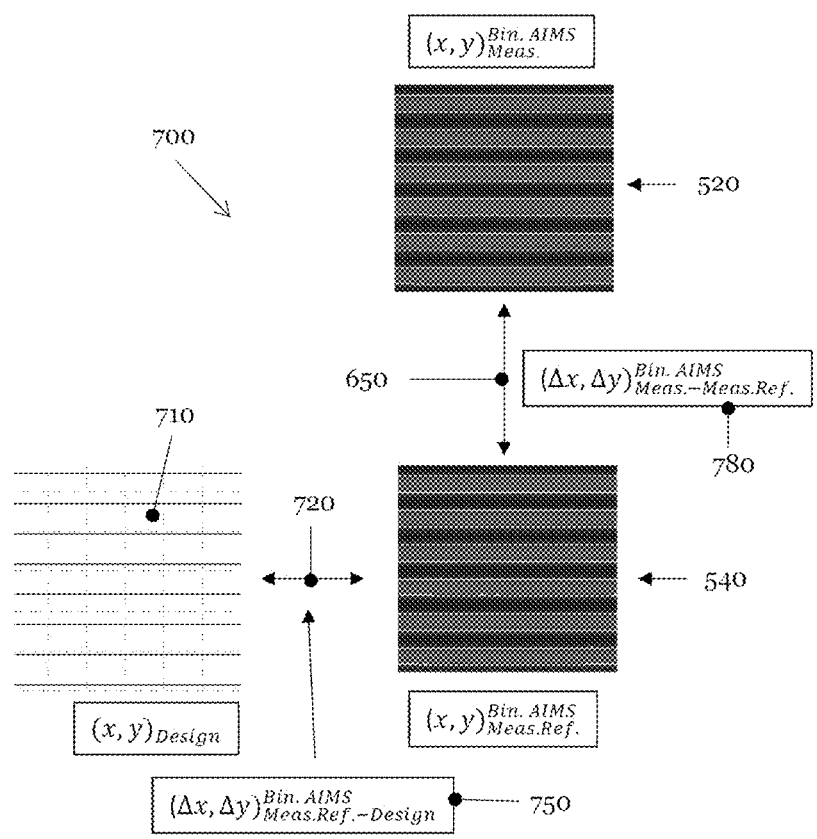
FIG. 7 presents in schematic form the correlation of a binary measured reference aerial image with design data and the correlation or superimposition of the reference aerial image referenced relative to the design data with a binary aerial image.

The diagram 700 in FIG. 7 presents a first possibility for improving the correlation process 650 of the binary aerial image 520 and of the binary reference aerial image 540. The design data are illustrated with the reference sign 710 in the diagram 700. In FIG. 7, the binary measured reference aerial image 540 is referenced relative to the design data 710. As a result, the coordinates of the binary measured reference aerial image 540 can be related with the fundamental coordinates $(x, y)_{Design}$ of the design data 710. As a result of correlating 720 the binary reference aerial image 540, having the following coordinates: $(x, y)_{Meas.Ref}^{Bin.AIMS}$, with the design data 710, the coordinate difference $(\Delta x, \Delta y)_{Meas.Ref-Design}^{Bin.AIMS}$ 750 is minimized. Disturbances of the coordinates of the reference aerial image 540 that are possibly present can be corrected by the process of correlating 720 the reference aerial image 540 with the design data 710. This means that the aerial image 540 correlated with the design data 710 has substantially no rotation and/or distortions with respect to the design data 710. In the process of correlating 650 the binary reference aerial image 540 with the binary aerial image 520, the two images are no longer equally valid, rather the binary reference aerial image 540 referenced relative to the design data 710 forms the master vis-à-vis the binary aerial image 520. In the process of superimposing 650 the two binary images 520, 540, differences in the two images 520, 540, for instance the coordinates of a defect 160, can be referenced relative to the fundamental design data 710.

Of course, in the configuration illustrated in FIG. 7, it is possible for the binary aerial image 520, instead of the binary reference aerial image 540, to be referenced relative to the design data 710 (not illustrated in FIG. 7). Furthermore, both the binary reference aerial image 540 and the binary aerial image 520 can be correlated with the design data 710 (likewise not shown in FIG. 7).

Figure 8:
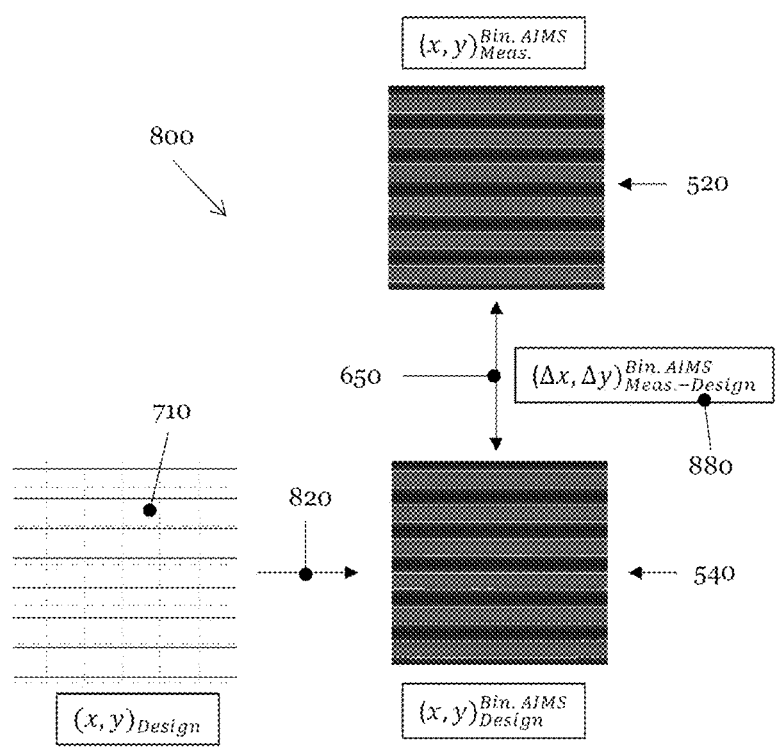
FIG. 8 repeats FIG. 7 with the difference that the reference aerial image from which the binary reference aerial image is derived is synthesized from the design data with the aid of a trained transformation model.

The diagram 800 in FIG. 8 shows vis-à-vis FIG. 7 the modification that the binary reference aerial image 540 is not derived from a measured aerial image 230, but rather is synthesized from the design data 710 directly by means of a trained transformation model. Synthesizing 820 a reference aerial image 270 can be carried out by the evaluation device 320. The pattern elements 340 of a reference aerial image 270 synthesized from the design data 710 have substantially no disturbances in relation to the design data 710. The coordinate difference $(\Delta x, \Delta y)_{Meas.-Design}^{Bin.AIMS}$ 880 thus directly represents the deviations of the binary aerial image 520 vis-à-vis the design data 710.

Furthermore, the evaluation device 320 can perform the task of deriving a binary reference aerial image 540 from the synthesized reference aerial image 270. In an alternative embodiment, a transformation model can be trained to directly synthesize a binary reference aerial image 540 from the design data 710.

Referring to FIG. 5 again, determining a defect 560 in the binary aerial image 520 can be carried out by subtracting the binary reference aerial image 540 from the binary aerial image 520. This process step is identified by the block 550 in FIG. 5. A defect 560 can be ascertained from the difference image 545 determined by means of subtraction. The defect 560 can be for example the defect 160 of the image 130 or the defect residue 190 of the image 170 of the photomask 110 from FIG. 1.

In step 570 in FIG. 5, the binary image 520 of the aerial image 230 which contains the defect 560 is analyzed in detail. For this purpose, for the binary image 565 of the aerial image 230 which contains the defect 560, a region of interest (ROI) 580 around the defect 560 is stipulated. An identical region of interest 580 is stipulated for the binary image 540 of the reference aerial image 270. As already explained above, stipulating the ROI 580 is typically carried out in an automated form.

The enlarged segment in FIG. 5 shows the region of interest 580 around the defect 560 with greater resolution. The enlarged segment in FIG. 5 illustrates an image 575 synthesized by the evaluation device 320, said image having been synthesized on the basis of measurement data. The bright lines denote the edges 525 of the strips 240 or generally the edges 525 of a pattern element 340, the determination of which has been explained above. In order to ascertain the defect 560 in the region of interest 580, use is made of a slice 590. The term "slice" 590 is used generally in English. The slice 590 is a rectangular structure having a settable width and a variable length 585. The length 585 of a slice 590 is stipulated by the distance between adjacent edges 525 of a pattern element 340 or of an absorbent strip 240. By means of measuring the distance between adjacent edges 525 of a pattern element 340 with the slice 590, data for a CD analysis can be recorded for a region of interest 580. A slice 590 can be stipulated individually for each region of interest 580.

Alternatively or additionally, besides the width of a pattern element 340, a distance between two different pattern elements 340 can be measured with the aid of a slice 590. Along the longitudinal direction of the slice 590, the intensity profile is determined on the basis of the edges 525 ascertained, which intensity profile can be used for the further analysis (analyses) of the binary image 565 of the aerial image 230 or respectively of the reference aerial image 270.

In the example described in the image 575 in FIG. 5, the distance between two absorbent strips 240 is measured with the aid of the slice 590. With the aid of the slice 590 it is also possible, of course, to measure the width of an absorbent strip 240 or the dimensions of a pattern element 340. The positioning of corresponding slices 590 in the ROI 580 can be carried out in an automated form.

As described above, the region of interest 580 of the binary image 540 of the reference aerial image 270 is likewise evaluated. As a result, a nominal pattern distance and/or a nominal pattern width can be ascertained within the region of interest 580 of the reference aerial image 270. On the database thus obtained, it is possible to carry out a CD (Critical Dimension) analysis for the region of interest 580 on the basis of a multiplicity of slices 590 within the region of interest.

Figure 9:
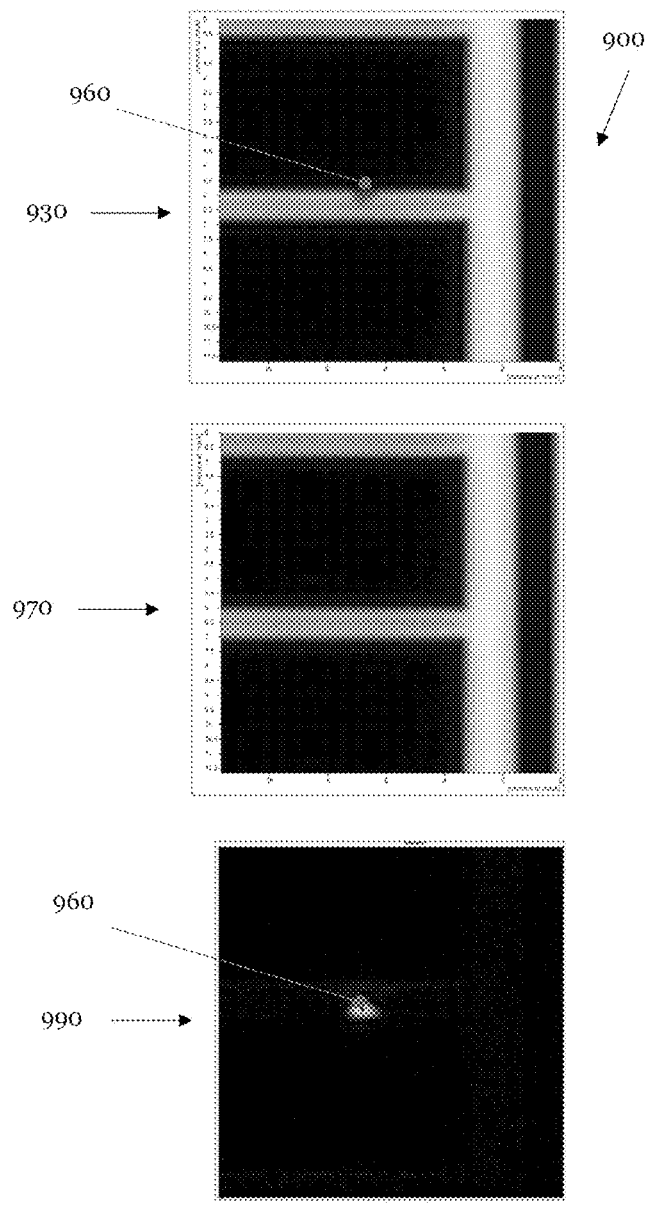
FIG. 9 illustrates the determination of a defect from a subtraction of a reference aerial image from a measured aerial image.

The diagram 900 in FIG. 9 schematically shows the process of ascertaining a defect 960 of an aerial image 930. The upper partial image reproduces the aerial image 930 with the defect 960. The middle partial image shows a reference aerial image 970, i.e. a structure substantially identical to the aerial image 930 but without the defect 960. The lower partial image shows a difference aerial image 990 generated by subtracting the reference aerial image 970 from the aerial image 930 of the upper partial image. The difference aerial image 990 represents the defect 960. In the example illustrated in FIG. 9, both the aerial image 930 and the reference aerial image 970 are referenced relative to the design data 710 by means of a binary aerial image (not shown in FIG. 9) and a binary reference aerial image (not illustrated in FIG. 9). As a result, the coordinates of the defect 960 of the difference aerial image 990 are also correlated with the fundamental design data 710. This makes possible, for example, an exact representation or superimposition of the defect 960 by means of the difference aerial image 990 in an image 130, 170 of a repair device 120 if the image 130, 170 of the repair device is in a defined relation to the design data 710.

Figure 10:
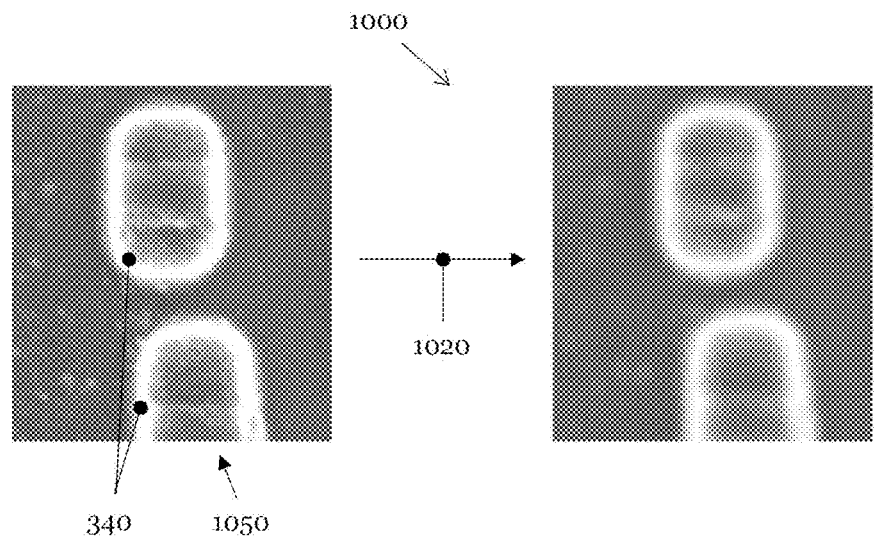
FIG. 10 illustrates in the left partial image two pattern elements of a photolithographic mask that were scanned by a scanning electron microscope, and reproduces in the right partial image the two pattern elements after a smoothing filter has been applied.

One example of ascertaining a binary image for an image 130, 170 of a repair device 120 is elucidated in the subsequent FIGS. 10 to 13. The diagram 1000 in FIG. 10 shows in the left partial image 1050 pattern elements 340 arranged on a substrate 150 of a photolithographic mask 110. The right partial image in FIG. 10 presents the two pattern elements 340 of the right partial image after a smoothing filter 1020 has been applied to the measurement data of the left partial image 1050 in FIG. 10. The smoothing filter 1020 can be embodied for example in the form of a convolution kernel, a Nagao filter or a non-local mean filter. A smoothing filter 1020 is described for example by: A. Buades, B. Coll and J.-M. Morel: "A non-local algorithm for image denoising," IEEE Computer Society Conference on Computer Vision and Pattern Recognition (CVPR '05), 2 60(65, IEEE (2005)).

Figure 11:
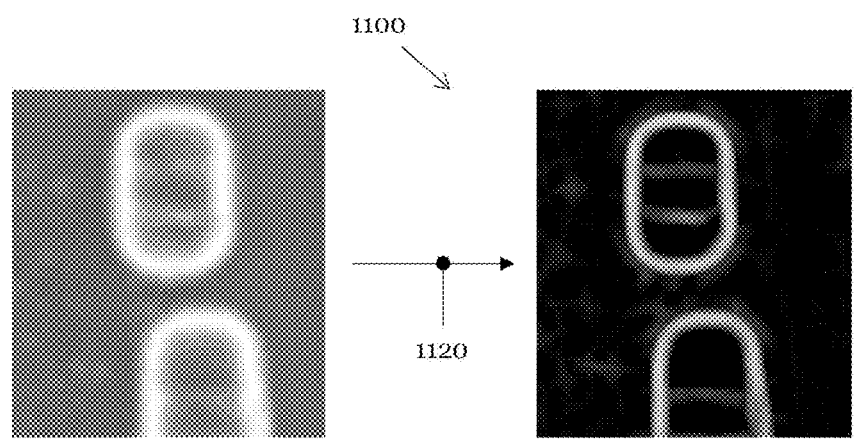
FIG. 11 repeats in the left partial image the two pattern elements of the right partial image from FIG. 10, and illustrates in the right partial image the application of a contour filter in the form of a second derivative of a greyscale value function to the two pattern elements in order to extract the contour thereof.

The diagram 1100 in FIG. 11 repeats in the left partial image the right partial image from FIG. 10. Next a contour filter 1120 is applied to the smoothed pattern elements 340 from FIG. 10. A contour filter 1120 can be realized for example as the second derivative of a greyscale value function. The right partial image in FIG. 11 reproduces the contour-filtered, smoothed pattern elements 340 from FIG. 10.

Figure 12:
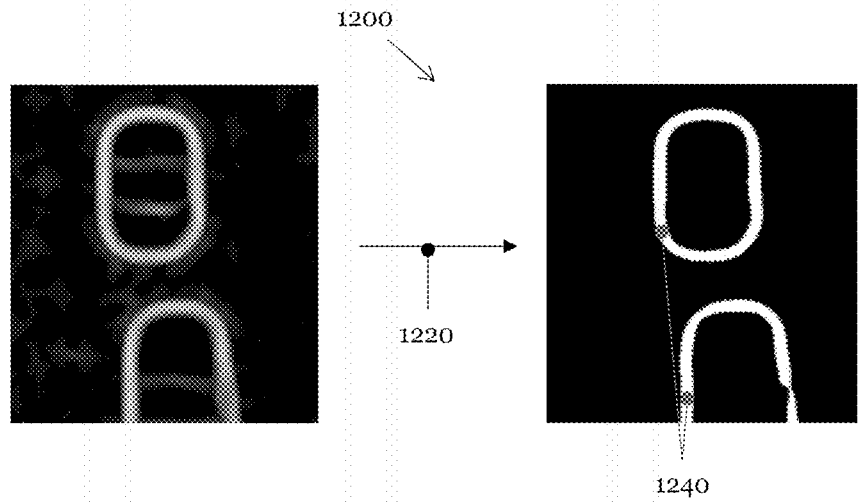
FIG. 12 repeats in the left partial image the two pattern elements of the right partial image from FIG. 11, and shows in the right partial image the generation of a binary image for the two pattern elements by applying a threshold condition.

The diagram 1200 in FIG. 12 describes the process of generating a binary image for the pattern elements 340 from FIG. 10. The right partial image in FIG. 12 once again repeats the contour-filtered, smoothed pattern elements from FIG. 11. In order to transform the left partial image in FIG. 12 into a binary image, in the manner similar to that described above in the context of FIG. 5 for an aerial image 230, a brightness threshold is stipulated for the image of the pattern elements 340. Brightness values which are lower than the brightness threshold in the left partial image are assigned the value zero. Brightness values that are greater than the brightness threshold in the right partial image are set to the value one. Ascertaining an optimum threshold condition can be carried out in an automated process. The right partial image in FIG. 12 presents the binary pattern elements 1240 as the result of the digitizing process 1220.

Figure 13:
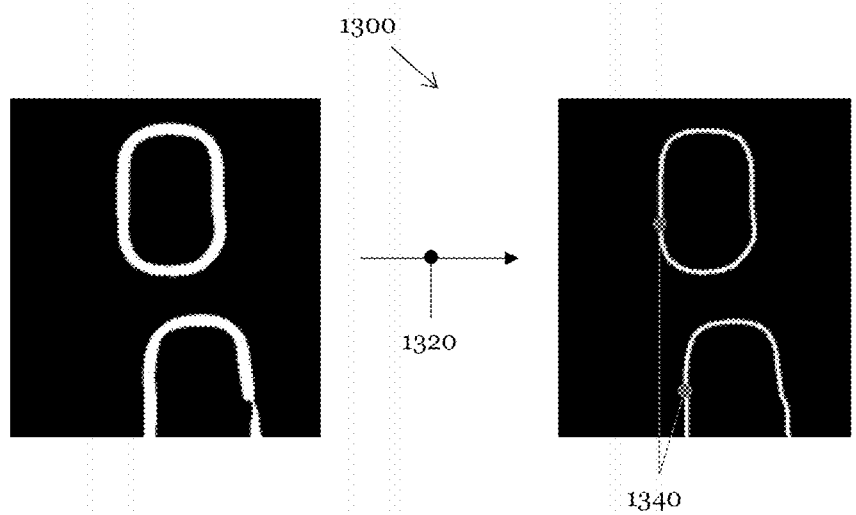
FIG. 13 repeats in the left partial image the two pattern elements of the right partial image from FIG. 12, and illustrates in the right partial image the determination of a binary image with a contour of uniform thickness from the binary pattern elements of the left partial image.

The diagram 1300 in FIG. 13 presents the process of ascertaining a uniform thickness of the binary contour 1240 of the contour-filtered and smoothed pattern elements 340 from FIG. 10. The left partial image in FIG. 13 once again repeats the binary pattern elements 1240 of the right partial image from FIG. 12. In a making-uniform process 1320, the binary pattern elements 1240 are transformed into the binary pattern elements 1340 having a uniform contour thickness. The right partial image in FIG. 13 reproduces the result of the making-uniform process 1320.

Figure 14:
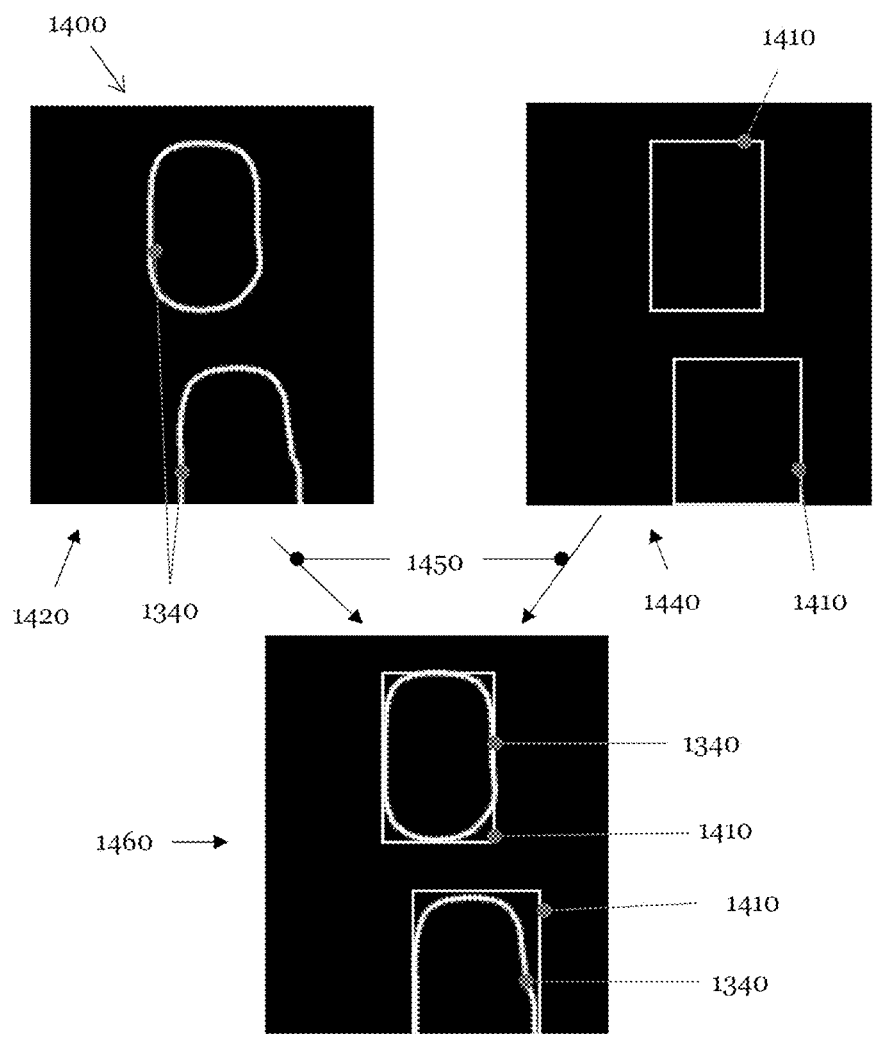
FIG. 14 repeats in the top left partial image the two pattern elements of the right partial image from FIG. 13, shows in the top right partial image two pattern elements of the design data corresponding to the pattern elements of the top left partial image, and reproduces in the lower partial image the correlation or superimposition of the pattern elements of the top left partial image with the pattern elements of the design data.

The diagram 1400 in FIG. 14 shows the process of superimposing 1450 or correlating 1450 the binary pattern elements 1340 made uniform, which were derived from the pattern elements 340 of an electron beam image 1050, with pattern elements 1410 of the design data 710 which correspond to the pattern elements 1340. The top left partial image 1420 in FIG. 14 once again repeats the binary pattern elements 1340 made uniform in the right partial image from FIG. 13. The top right partial image 1440 in FIG. 14 presents the pattern elements 1410 of the design data 710 which correspond to the binary pattern elements 1340. The bottom partial image 1460 in FIG. 14 illustrates the process of correlating 1450 or superimposing 1450 the binary pattern elements 1340 with the pattern elements 1410 of the design data 710. Correlating the binary pattern elements 1340 with the pattern elements 1410 can comprise scaling the binary pattern elements 1340. Furthermore, aligning the binary pattern elements 1340 with the pattern elements 1410 can comprise rotating and/or rectifying the binary pattern elements 1340 vis-à-vis the pattern elements 1410 of the design data 710. After the correlation process indicated by the arrows 1450 in FIG. 14 has been carried out, the binary pattern elements 1340 have coordinates that are in a fixed relation to the coordinates of the pattern elements 1410 of the design data 710. The described correlation process 1450 between the binary pattern elements 1340 and the pattern elements 1410 can be carried out by the evaluation device 320 in an automated form.

Figure 15:
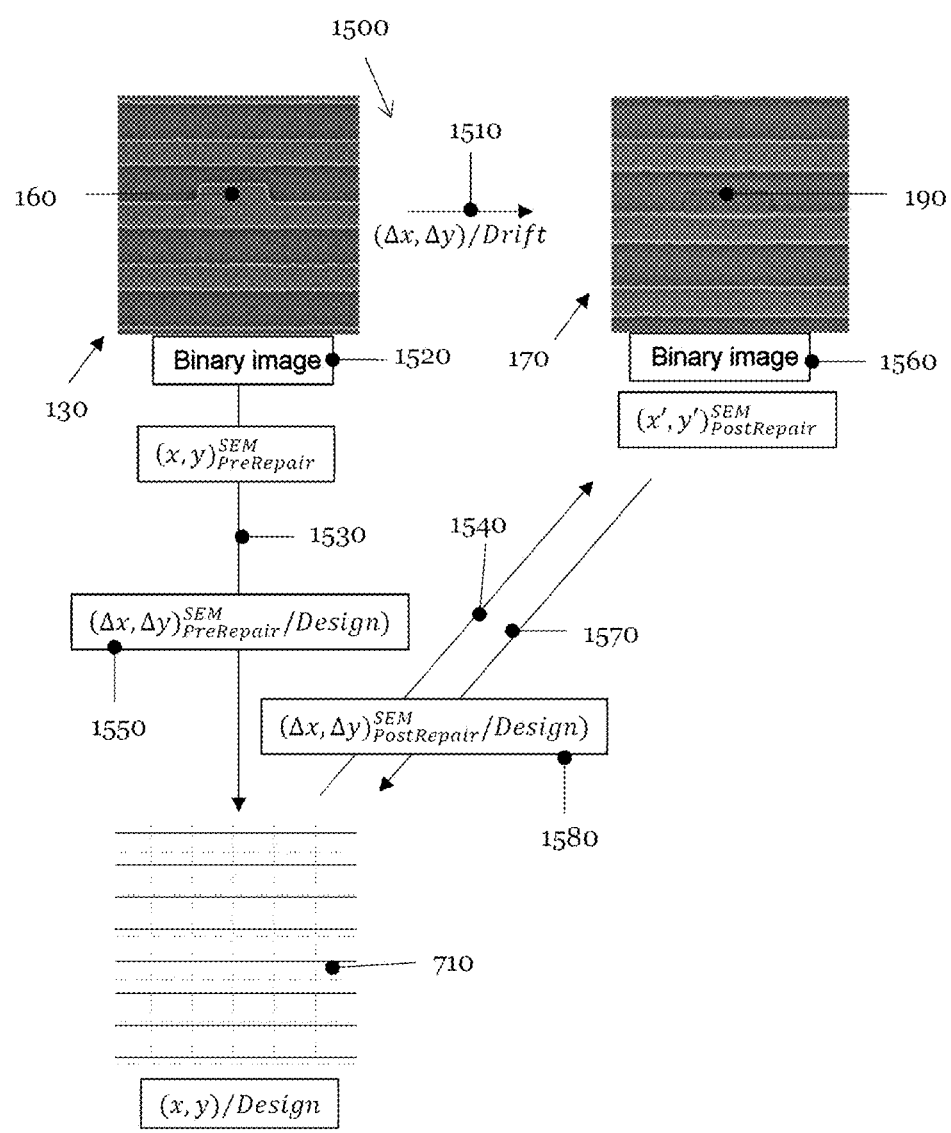
FIG. 15 schematically illustrates the correlation of the image of the defect from FIG. 1 before the repair of the defect and the image of the defect after carrying out a repair process with the design data of the photolithographic mask.

FIG. 15 shows two possible applications for correlating images 130, 170 measured by means of the electron beam 415 of the repair device 120 with corresponding pattern elements 1450 of the design data 710. In the top left partial image, FIG. 15 once again illustrates the image 130 from FIG. 1. The image 130 contains the defect 160 before the repair thereof by the repair device 120. The top right image reproduces the image 170 from FIG. 1 after the repair of the defect 160. The defect residue 190 that has remained after the repair is discernible in the image 170. A drift ($\Delta x$, $\Delta y$)/Drift 1510 of the point of incidence 422 of the electron beam 415 of the repair device 120 on the photolithographic mask 110 can occur during the repair of the defect 160 by the repair device 120 described in FIG. 4. The drift 1510 can be brought about for example by a thermal drift of the electron beam 415 of the repair device 120 and/or by a thermal drift of the sample or mask mount 402 carrying the photolithographic mask 110. The drift 1510 can adversely affect the repair of the defect 160 by the repair device 120, or even make it impossible. Therefore, the drift 1510 is typically measured and corrected if necessary during a repair process.

In order to assess the quality of the defect repair, it is advantageous to superimpose the image 170 of the repair device 120 after the defect repair with an aerial image 230 or with a synthesized image of the evaluation device 320, for instance the binary image 575 from FIG. 5. In order to be able to carry this out exactly and reproducibly, the image 130 containing the defect 160 before the repair thereof is transformed into a binary image 1520, as explained above in the context of FIGS. 10 to 13. The coordinates of the binary image 1520 of the image 130 are then determined. In the next step, the binary image 1520 is correlated with the pattern element(s) 1410 of the design data 710 that correspond to the image 130. The correlation process is illustrated by the arrow 1530 in FIG. 15. The difference between the coordinates of the binary image 1520 and the design data 710 can be ascertained: $(\Delta x, \Delta y)_{PreRepair}^{SEM}$/Design. By virtue of the fact that the binary image 1520 of the image 130 before the repair of the defect 160 is correlated with the design data 710, the image 170 indicating the defect residue 190 can likewise be referenced relative to the design data 710 if the drift 1510 was measured during the repair process. This is illustrated by the arrow 1540 directed upwards in FIG. 15. An aerial image 230 which is likewise referenced relative to the design data 710 or is correlated with the design data 710 can be superimposed on the image 170 of the corrected defect 160 exactly and reproducibly (not shown in FIG. 15).

In an alternative embodiment, the image 170 of the defect residue 190 can be correlated with the corresponding pattern elements 1410 of the design data 710. This is symbolized by the arrow 1570 directed downwards in FIG. 15. For this purpose, a binary image 1560 is derived from the image 170 of the defect residue 190, as explained above with reference to FIGS. 10 to 13. The coordinates of the binary image 1560 are then determined: $(x', y')_{PostRepair}^{SEM}$. The coordinates of the binary image 1560 are referenced relative to the coordinates of the design data 710 by the pattern elements 1340 of the binary image 1560 being correlated with the corresponding pattern elements 1410 of the design data 710. In the alternative embodiment, it is possible to calculate the drift 1510 during the repair process on the basis of the two images 130, 170 referenced relative to the design data 710.

Figure 16:
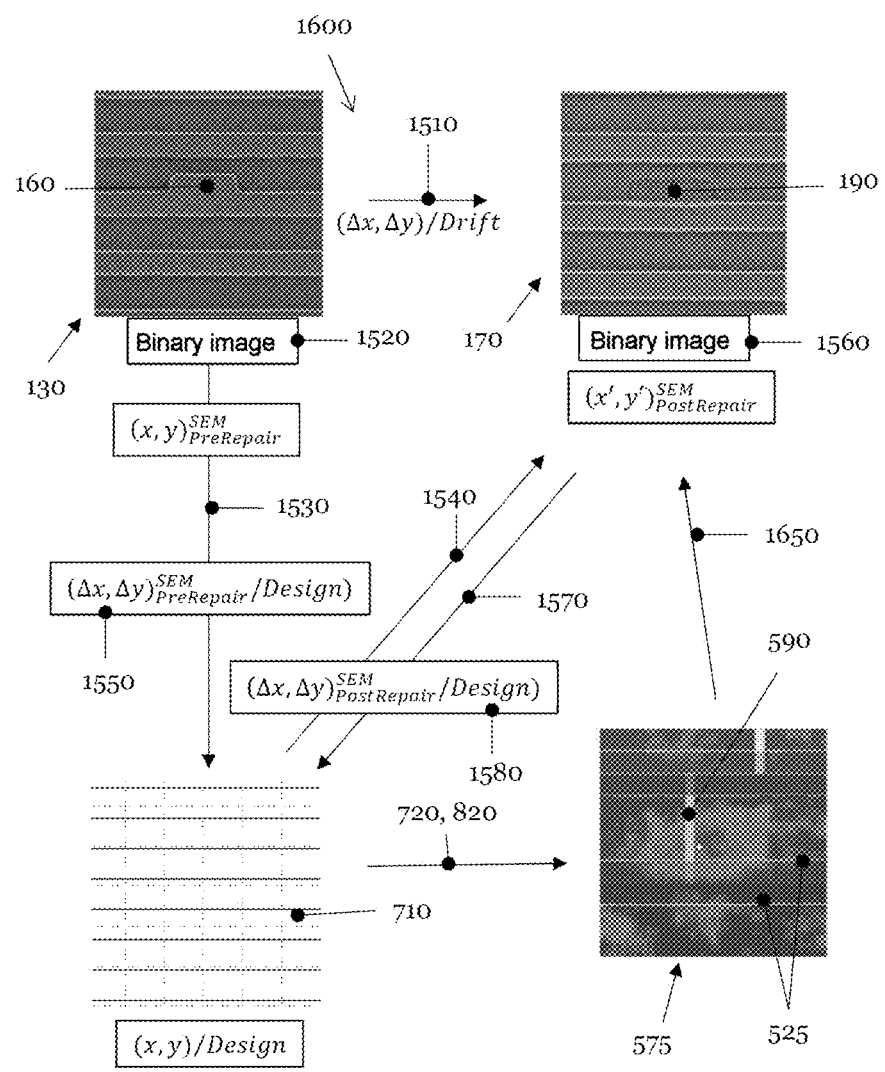
FIG. 16 schematically reproduces the superimposition of the synthetic defect image reproduced in FIG. 5 with the image of the repaired defect from FIG. 15.

The diagram 1600 in FIG. 16 once again reproduces the diagram 1500 from FIG. 15. In addition, FIG. 16 also indicates the image 575 or the image segment 575 from FIG. 5. The image 575 describes the evaluation of the aerial image 230 with the aid of the binary aerial image 520 and the binary reference aerial image 540. The coordinates of the image 575 are thus referenced relative to the coordinates the design data 710. This is symbolized by the arrow 720, 820 in FIG. 16. The image 575 can thus be superimposed on the image 170 exactly, i.e. on the SEM image 170 of the repair device 120 with the correct scaling, the correct orientation and without distortion. This process is illustrated by the arrow 1650 in FIG. 16. In addition, the transparency of the image 575 can be altered, such that the pattern elements 240 of the two images 170 and 575 can be made visible to an observer alternatively or simultaneously.

Figure 17:
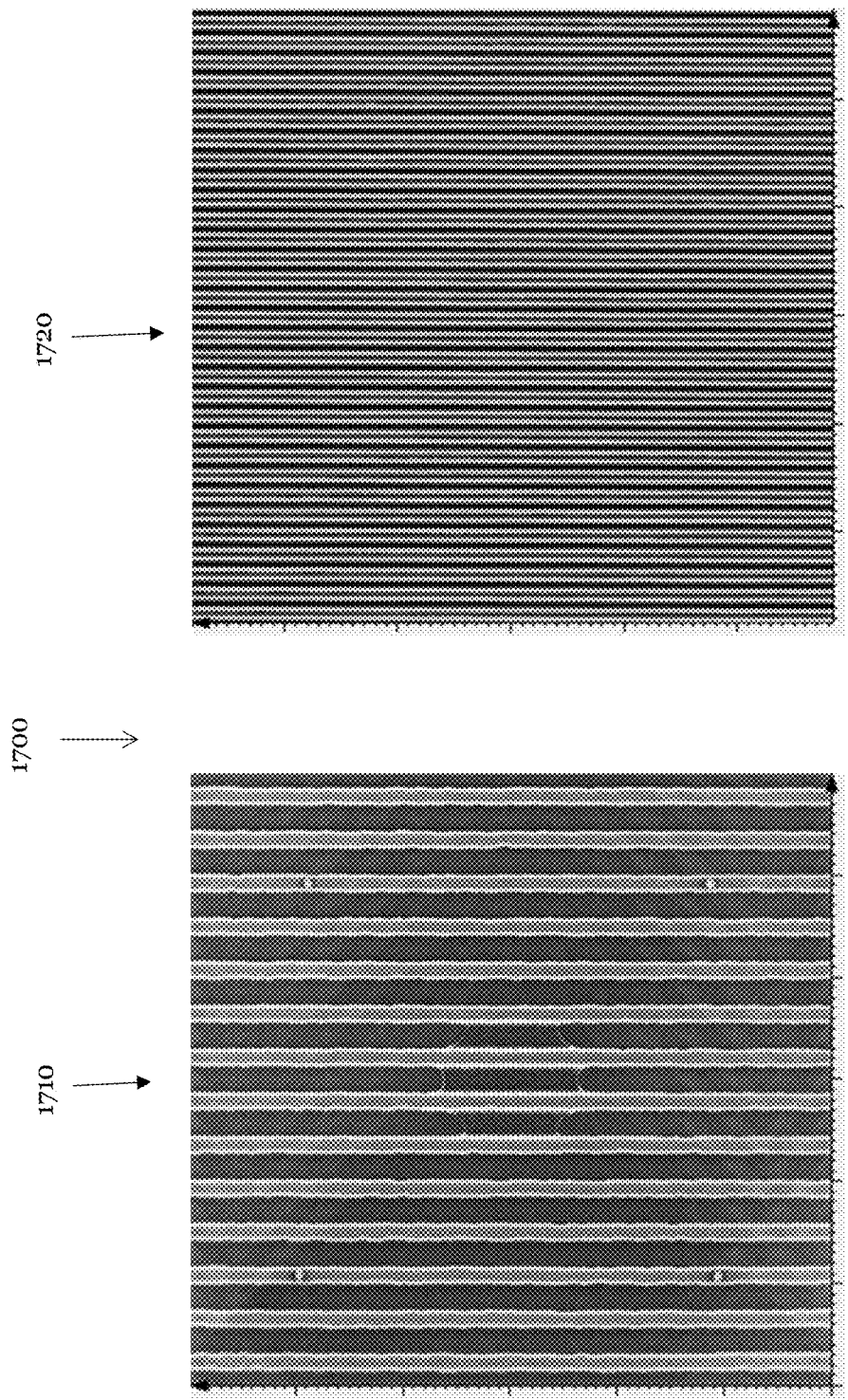
FIG. 17 shows in the left partial image a scanning electron microscope image after the repair of a defect, and presents in the right partial image an aerial image of the photomask of the left partial image, wherein both partial images are referenced relative to the design data of the photolithographic mask.

The diagram 1700 in FIG. 17 presents in the left partial image 1710 in an enlarged view the image 170 from FIG. 1, i.e. the image 130 after carrying out a repair of the defect 160. As discussed above during the discussion of FIG. 15, the image 170 of the scanning electron microscope 410 can be correlated with the design data 710 of the photomask 110. This correlation process has been carried out for the image 1710. The right partial image 1720 in FIG. 17 shows in an enlarged view the aerial image 230 that was measured with the aid of the AIMS™ tool 220. As explained in the context of the explanations of FIG. 5, the aerial image 230 is evaluated with regard to the occurrence of a defect 560 with the aid of the associated reference aerial image 270 by way of deriving the binary images 520 and 540. In addition, the aerial image 230, the reference aerial image 270 or both can be correlated with the design data 710 by means of their binary images 520, 540. This correlation was carried out for the partial image 1720. By virtue of the correlation processes which are carried out for the images 1710, 1720 and which the evaluation device 320 can carry out substantially automatically, it is ensured that the images 1710, 1720 arranged next to one another are not distorted or rotated relative to one another.

Figure 18:
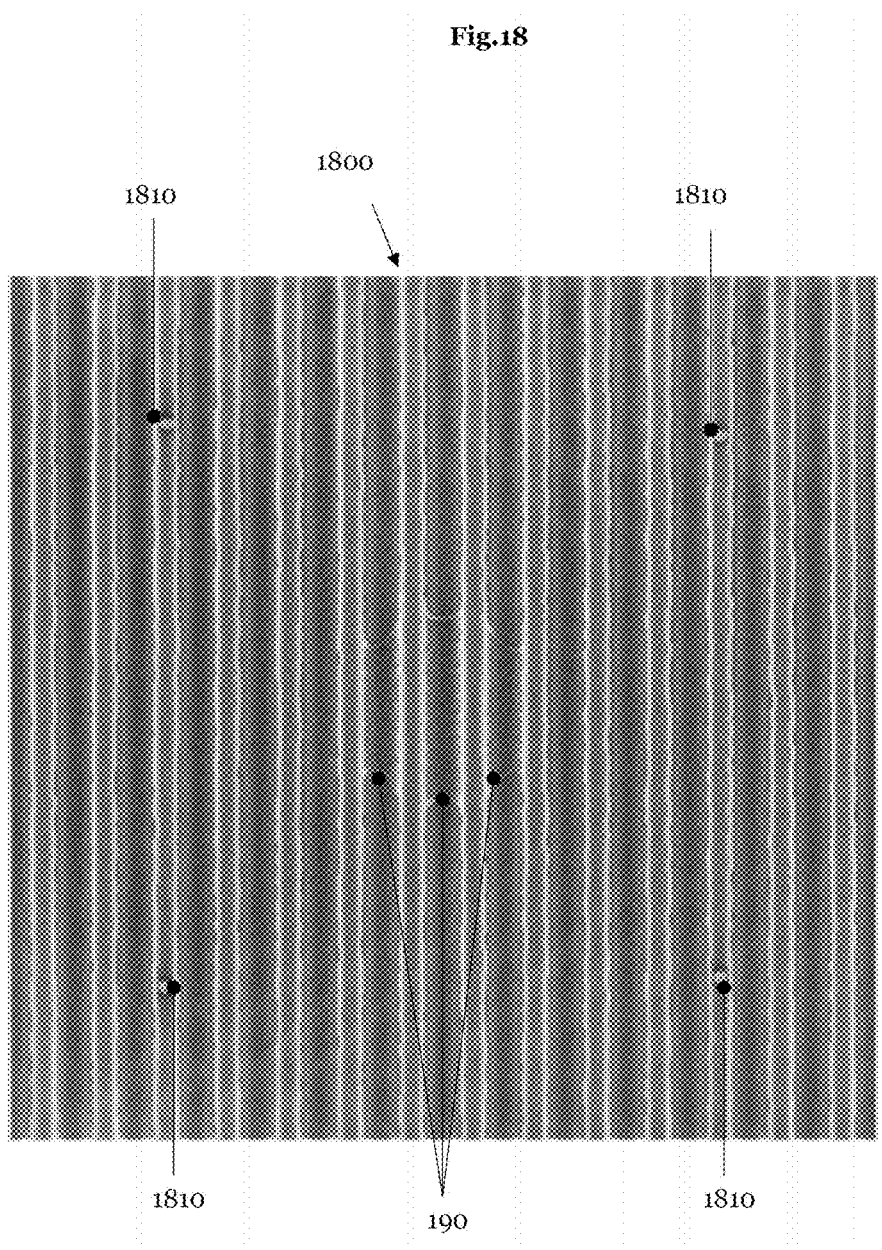
FIG. 18 shows a superimposition of the two partial images from FIG. 17.

FIG. 18 shows a superimposition 1450 of the two partial images 1710 and 1720 from FIG. 17. The transparency of the aerial image 230 was set such that both the image 170 and the aerial image 230 can be viewed comfortably. In the superimposed image 1800, residues 190 of the defect 160 are still discernible in the central region. Furthermore, the four markings 1810 that were applied on the photolithographic mask 110 in order to monitor the drift 1510 during the defect repair are still discernible in the superimposed image 1800.

Figure 19:
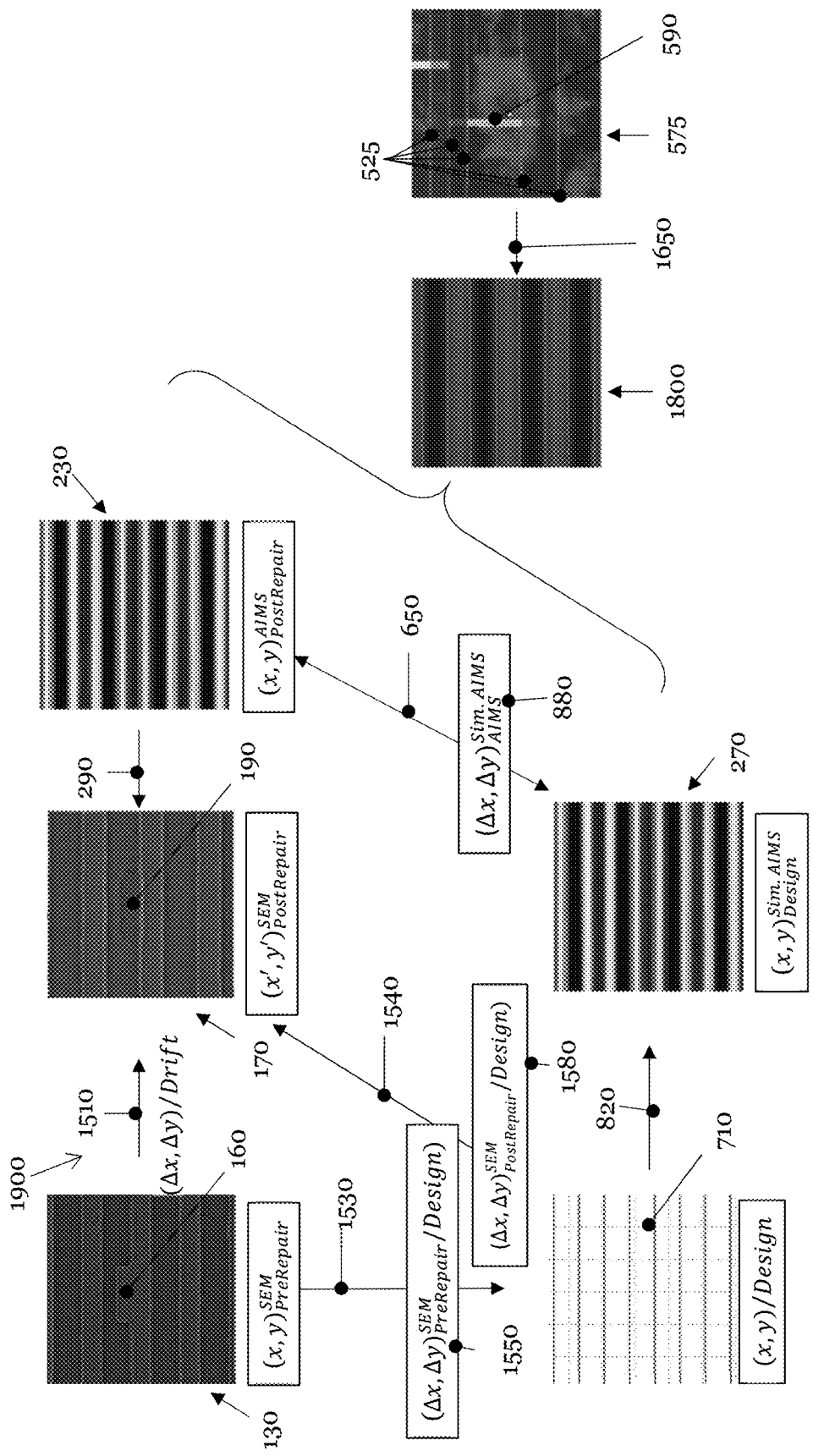
FIG. 19 illustrates a superimposition of a scanning electron beam image showing a repaired defect, an aerial image of the repaired region and a synthesized image of an evaluation device.

FIG. 19 combines FIGS. 7, 8, 15, 16 and 18. In order not to overload FIG. 19, the reference to the corresponding binary images 520, 540, 1520, 1560 of the images 130, 170, 230, 270 has been suppressed in the diagram 1900. Each of the images 130, 170, 230, 270 is linked by reference or correlation 650, 820, 1510, 1530, 1540 with the design data 710 of the photolithographic mask 110. By way of the correlation 720 (not illustrated in FIG. 19) or respectively 820, the image 575 synthesized from the measurement data by the evaluation device 320 is uniquely related to the design data 710. Accordingly, each of the images 130, 170, 230, 270, 575 can be superimposed with each image 130, 170, 230, 270, 575 exactly and reproducibly. The images 130 and 170 were measured by the repair device 120. The image 230 or the images 230, 270 was/were recorded by the AIMS™ tool 220. The images of further imaging measuring devices, for instance the images of a scanning probe microscope 480, following a unique reference to the design data 710, can likewise be superimposed on one or a plurality of the images 130, 170, 230, 270 and 575 (not shown in FIG. 19). In the example in FIG. 19, the binary image 575 is synthesized by the evaluation device 320 from the images 230 and 270 or respectively the binary counterparts 520, 540 by difference formation.

As viewed from the viewing angle of the application, it is currently particularly expedient for the image 170 of the defect residue 190 captured by the repair device 120 after a repair to be precisely superimposed with the corresponding aerial image 170. This superimposition is illustrated by the arrow 290 in FIGS. 1 and 19. The superimposed image is identified by the reference sign 1800 in FIGS. 18 and 19. Furthermore, it is often advantageous for the image 575 synthesized by the evaluation device 320 also additionally to be superimposed on the superimposed image 1800. This superimposition process is symbolized by the arrow 1650 in FIG. 19. An image of the repaired location 190 of the photolithographic mask 110 which concentrates all essential information in a graphical representation is generated by way of the superimposition of the three images 170, 230 and 575.

Figure 20:
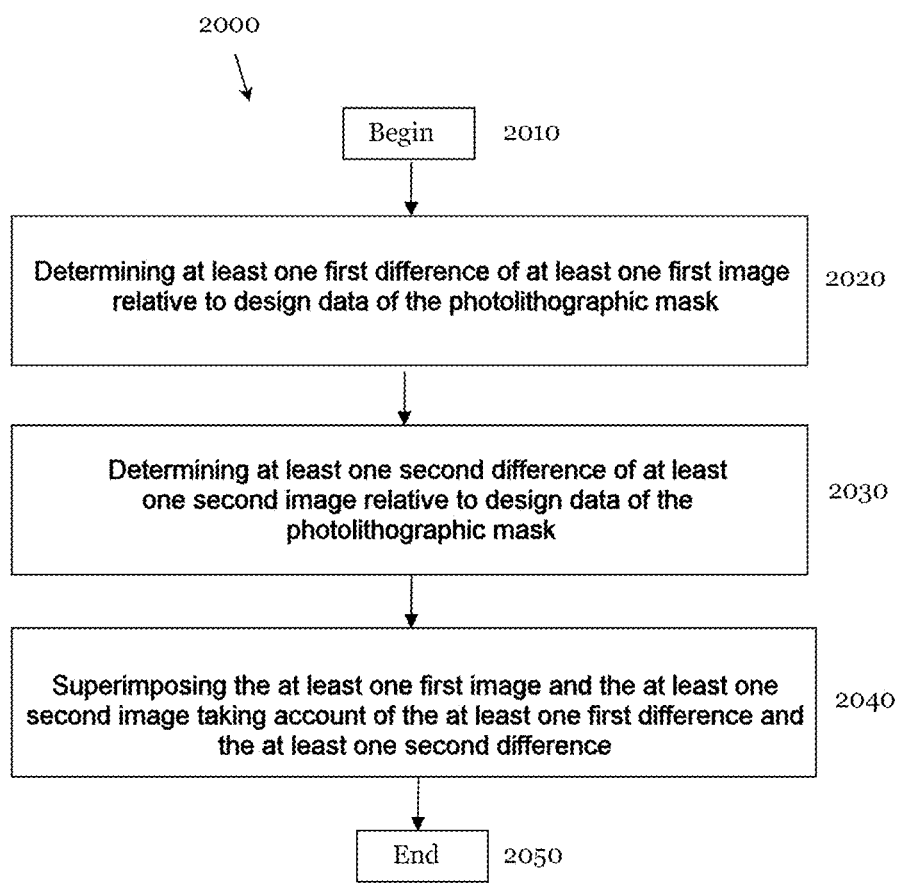
FIG. 20 reproduces a flow diagram of the method for superimposing at least two images of a photolithographic mask.

The flow diagram 2000 in FIG. 20 represents, in some implementations, essential steps of the method for superimposing 1450 at least two images 130, 170, 230, 270, 575 of a photolithographic mask 110. The method begins in step 2010. Step 2020 involves determining at least one first difference 1550 of at least one first image 130 relative to design data 710 of the photolithographic mask 110. This step can be carried out by an evaluation device 320. If the first image 130 is not already present in a non-volatile memory, for example the non-volatile memory of the evaluation device 320, but rather has to be measured, a scanning particle microscope 410, an AIMS™ tool 220 or a scanning probe microscope 480 can be used for this purpose.

Step 2030 involves determining at least one second difference 880, 1580 of at least one second image 170, 230, 270, 575 relative to design data 710 of the photolithographic mask 110. This step can likewise be carried out by the evaluation device 320. If the at least one second image 170, 230, 270, 575 is not present in a non-volatile memory, for instance the non-volatile memory of the evaluation device 320, but rather has to be measured, a scanning particle microscope 410, an AIMS™ tool 220 or a scanning probe microscope 480 can be used for this purpose.

Step 2040 involves superimposing or correlating 1450 the at least one first image 130 and the at least one second image 170, 230, 270, 575 taking account of the at least one first difference 1550 and the at least one second difference 880, 1580. The correlating 1450 can be carried out by the evaluation device 320 in an automated form. The method 2000 ends in step 2050.

Other implementations for superimposing at least two images (e.g., 130, 170, 230, 270, 575) of a photolithographic mask (e.g., 110) can involve a process that includes steps different from those shown in FIG. 20. For example, the process can include more or fewer steps than those shown in FIG. 20.

In some implementations, the evaluation device 320 (FIG. 2) or the computer system 430 (FIG. 4) can include one or more data processors for processing data, one or more storage devices for storing data, such as one or more databases, and/or one or more computer programs including instructions that when executed by the evaluation device or computer system causes the evaluation device or computer system to carry out the computations or processes described above. In some implementations, the evaluation device or computer system can include digital electronic circuitry, computer hardware, firmware, software, or any combination of the above. The features related to processing of data can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively or addition, the program instructions can be encoded on a propagated signal that is an artificially generated signal, e.g., a machine-generated electrical, optical, or electromagnetic signal, that is generated to encode information for transmission to suitable receiver apparatus for execution by a programmable processor.

In some implementations, the operations associated with processing of data described in this document can be performed by one or more programmable processors executing one or more computer programs to perform the functions described in this document. A computer program can be written in any form of programming language, including compiled or interpreted languages, and it can be deployed in any form, including as a stand-alone program or as a module, component, subroutine, or other unit suitable for use in a computing environment.

For example, the evaluation device 320 or the computer system 430 can include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as hard drives, magnetic disks, magneto-optical disks, or optical disks. Machine-readable storage media suitable for embodying computer program instructions and data include various forms of non-volatile storage area, including by way of example, semiconductor storage devices, e.g., EPROM, EEPROM, and flash storage devices; magnetic disks, e.g., internal hard disks or removable disks; magneto-optical disks; and CD-ROM and DVD-ROM discs.

In some implementations, the data processing (e.g., generating point spread functions, performing phase reconstructions) described above can be implemented using software for execution on one or more mobile computing devices, one or more local computing devices, one or more remote computing devices, and/or one or more cloud computing servers. For instance, the software forms procedures in one or more computer programs that execute on one or more programmed or programmable computer systems, either in the mobile computing devices, local computing devices, or remote computing systems (which may be of various architectures such as distributed, client/server, or grid), each including at least one processor, at least one data storage system (including volatile and non-volatile memory and/or storage elements), at least one wired or wireless input device or port, and at least one wired or wireless output device or port.

In some implementations, the software may be provided on a medium, such as a CD-ROM, DVD-ROM, Blu-ray disc, hard drive, or flash drive, readable by a general or special purpose programmable computer or delivered (encoded in a propagated signal) over a network to the computer where it is executed. The functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. The separation of various system components in the embodiments described above should not be understood as requiring such separation in all embodiments. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the radiation source used in this invention can provide electromagnetic radiation having a wavelength of 5 nm, 7 nm, or in a range from 5 nm to 10 nm. The other components of the device for superimposing at least two images of a photolithographic mask can be adapted accordingly. In addition, the actions recited in the claims can be performed in a different order and still achieve desirable results.

What is claimed is:

1. A method for superimposing at least two images of a photolithographic mask, the method comprising:
   a. determining at least one first difference of at least one first image relative to design data of the photolithographic mask;
   b. determining at least one second difference of at least one second image relative to design data of the photolithographic mask, or relative to the at least one first image;
   c. wherein determining the at least one first difference comprises: generating at least one first binary image from the at least one first image, and/or wherein determining the at least one second difference comprises: generating at least one second binary image from the at least one second image; and
   d. superimposing the at least one first image and the at least one second image taking account of the at least one first difference and the at least one second difference.

2. The method of claim 1, wherein the at least one first image is recorded by a first measuring device and the at least one second image is recorded by a second measuring device, and wherein the first measuring device and the second measuring device use different measurement principles.

3. The method of claim 1, wherein the at least one first image and the at least one second image are recorded by one measuring device.

4. The method of claim 1, wherein the at least one second image is synthesized from design data.

5. The method of claim 4, wherein synthesizing the at least one second image comprises: applying a trained transformation model for synthesizing the at least one second image from design data.

6. The method of claim 4, wherein determining the at least one second difference comprises: determining a difference between the synthesized second image and at least one measured second image.

7. The method of claim 6, wherein determining the at least one second difference comprises: determining a coordinate difference between at least one pattern element of the at least one binary measured second image and the at least one pattern element of the binary synthesized second image.

8. The method of claim 1, wherein the at least one second image comprises an image generated by an evaluation device.

9. The method of claim 8, wherein the image generated by the evaluation device comprises at least one slice which, along its longitudinal direction, determines an optical intensity profile of the photolithographic mask.

10. The method of claim 1, wherein generating the at least one first binary image and/or the at least one second binary image comprises: applying a contrast-based metric to the at least one first image and/or the at least one second image.

11. The method of claim 10, wherein applying the contrast-based metric comprises: stipulating a threshold value defining a transition from dark to bright in the at least one first image and/or the at least one second image.

12. The method of claim 1, wherein determining the at least one first difference comprises: determining at least one first deviation of at least one pattern element of the first binary image from the at least one pattern element of the design data and/or wherein determining the at least one second difference comprises: determining at least one second deviation of at least one pattern element of the second binary image from the at least one pattern element of the design data.

13. The method of claim 12, wherein determining the at least one first deviation comprises: determining a coordinate difference between the at least one pattern element of the design data and the at least one pattern element of the first binary image, and/or wherein determining the at least one second deviation comprises: determining a coordinate difference between the at least one pattern element of the design data and the at least one pattern element of the second binary image.

14. The method of claim 1, wherein determining the at least one second difference between the at least one second image and the at least one first image comprises: determining a drift of the measuring device in a time interval between recording the at least one first image and the at least one second image.

15. The method of claim 1, wherein the at least one first image comprises at least one element from the group: an image of a scanning particle microscope recorded at a first point in time, a measured aerial image, and an image of a scanning probe microscope recorded at a first point in time, and wherein the at least one second image comprises at least one element from the group: an image of the scanning particle microscope recorded at a second time, a measured reference aerial image, an aerial image synthesized from design data, an image which is recorded by a first measuring device and, by use of a trained transformation model, is transformed into an image which appears as though it was recorded by a second measuring device, an image of the scanning probe microscope recorded at a second point in time, and an image synthesized by an evaluation device.

16. The method of claim 1, furthermore comprising the following step: determining at least one defect of the photolithographic mask from the superimposed image.

17. A computer-readable medium storing a computer program comprising instructions that cause a computer system to carry out the method steps of claim 1 when the computer system executes the computer program.

18. The method of claim 1 in which each pixel in the at least one first binary image has one of two values, and/or each pixel in the at least one second binary image has one of two values.

19. The method of claim 18 in which generating at least one first binary image comprises generating at least one first binary image from the at least one first image by assigning a value zero for brightness values lower than a brightness threshold, and assigning a value one for brightness values equal to or greater than the brightness threshold; and/or wherein generating at least one second binary image comprises generating at least one second binary image from the at least one second image by assigning a value zero for brightness values lower than a brightness threshold, and assigning a value one for brightness values equal to or greater than the brightness threshold.

20. A device for superimposing at least two images of a photolithographic mask, the device comprising:
  a. means for determining at least one first difference of at least one first image relative to design data of the photolithographic mask;
  b. means for determining at least one second difference of at least one second image relative to design data of the photolithographic mask, or relative to the at least one first image;
  c. wherein the means for determining the at least one first difference comprises: means for generating at least one first binary image from the at least one first image, and/or wherein the means for determining the at least one second difference comprises: means for generating at least one second binary image from the at least one second image; and
  d. means for superimposing the at least one first image and the at least one second image taking account of the at least one first difference and the at least one second difference.

21. The device of claim 20, wherein the device is configured to carry out the method steps of claim 1.

22. The device of claim 20, wherein the device is configured to carry out the method steps of claim 2.

* * * * *

UNITED STATES PATENT AND TRADEMARK OFFICE
CERTIFICATE OF CORRECTION

PATENT NO. : 11,620,429 B2
APPLICATION NO. : 16/912914
DATED : April 4, 2023
INVENTOR(S) : Gilles Tabbone and Carsten Schmidt It is certified that error appears in the above-identified patent and that said Letters Patent is hereby corrected as shown below:

In the Specification

Column 4
Line 58, delete "mask" and insert -- mask. --

Column 17
Line 33, delete "AIMS"" and insert -- AIMS™ --

Column 23
Line 24, delete "$(x, y)_{Meas.Ref}^{Bin.AIMS}$" and insert -- $(x, y)_{Meas.Ref.}^{Bin.AIMS}$ --

Line 32, delete "$(\Delta x, \Delta y)_{Meas-Meas.Ref.}^{Bin.AIMS}$" and insert -- $(\Delta x, \Delta y)_{Meas.-Meas.Ref.}^{Bin.AIMS}$ --

Line 50, delete "$(x, y)_{Meas.Ref}^{Bin.AIMS}$" and insert -- $(x, y)_{Meas.Ref.}^{Bin.AIMS}$ --

Lines 51-52, delete "$(\Delta x, \Delta y)_{Meas.Ref-Design}^{Bin.AIMS}$" and insert -- $(\Delta x, \Delta y)_{Meas.Ref.-Design}^{Bin.AIMS}$ --

Signed and Sealed this
Seventh Day of November, 2023

Katherine Kelly Vidal
*Director of the United States Patent and Trademark Office*